(12) United States Patent
Thorson et al.

(10) Patent No.: US 7,900,661 B2
(45) Date of Patent: Mar. 8, 2011

(54) PLUNGE ROUTER AND KIT

(75) Inventors: Troy C. Thorson, Waukesha, WI (US);
Andrew J. Weber, Cudahy, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 168 days.

(21) Appl. No.: 12/194,335

(22) Filed: Aug. 19, 2008

(65) Prior Publication Data

US 2009/0050236 A1 Feb. 26, 2009

Related U.S. Application Data

(60) Provisional application No. 60/965,373, filed on Aug. 20, 2007.

(51) Int. Cl.
*B27C 5/10* (2006.01)
(52) U.S. Cl. .................................. 144/136.95; 409/182
(58) Field of Classification Search ............ 144/136.95, 144/154.5; 409/182, 206, 210, 218
See application file for complete search history.

(56) References Cited

U.S. PATENT DOCUMENTS

| | | |
|---|---|---|
| 542,568 A | 7/1895 | Miller |
| 712,843 A | 11/1902 | Paul |
| 1,565,790 A | 12/1925 | Carter |
| 1,586,412 A | 5/1926 | Curtis |
| 1,611,381 A | 12/1926 | Salsbury |
| 1,820,162 A | 8/1931 | Salvat |
| 1,882,586 A | 10/1932 | Haynes |
| 1,960,699 A | 5/1934 | Galloway |
| 2,504,880 A | 4/1950 | Rittenhouse |
| 2,513,894 A | 7/1950 | Rogers |
| 2,625,844 A | 1/1953 | Beckett et al. |
| 2,630,152 A | 3/1953 | Turnbull |
| 2,799,305 A | 7/1957 | Groehn |
| 2,842,173 A | 7/1958 | Turner et al. |
| 2,943,654 A | 7/1960 | Emmons |
| 3,289,718 A | 12/1966 | Willis |
| 3,317,076 A | 5/1967 | Enders |
| 3,363,510 A | 1/1968 | Burrows et al. |
| 3,451,133 A | 6/1969 | Hathaway et al. |
| 3,466,973 A | 9/1969 | Rees |
| 3,481,453 A | 12/1969 | Shreve, III et al. |
| 3,487,747 A | 1/1970 | Burrows et al. |
| 3,489,191 A | 1/1970 | Blevins |
| 3,490,502 A | 1/1970 | Willis |
| 3,494,395 A | 2/1970 | Graham |

(Continued)

FOREIGN PATENT DOCUMENTS

CA 2314653 1/2001

(Continued)

*Primary Examiner* — Shelley Self
(74) *Attorney, Agent, or Firm* — Michael Best & Friedrich LLP

(57) ABSTRACT

A plunge router and kit are provided. In some aspects, a kit includes a first router base, a second router base, a motor assembly, and a depth adjustment mechanism at least partially supported by the motor assembly. The motor assembly is interchangeably supported by the first and second router bases. The depth adjustment mechanism adjusts a depth of cut of a tool element relative to the router base on which it is supported. The motor assembly may also be inserted into and supported by the first and second router bases along a substantially linear path. In other aspects, a depth of cut of a plunge router is finely adjustable. The depth of cut may also be coarsely adjustable.

19 Claims, 31 Drawing Sheets

U.S. PATENT DOCUMENTS

| | | |
|---|---|---|
| 3,512,740 A | 5/1970 | Podwalny |
| 3,556,623 A | 1/1971 | Damijonaitis |
| 3,587,387 A | 6/1971 | Burrows |
| 3,710,833 A | 1/1973 | Hammer et al. |
| 3,767,876 A | 10/1973 | Batson |
| 3,767,948 A | 10/1973 | Batson |
| 3,786,846 A | 1/1974 | Mehring |
| 3,827,820 A | 8/1974 | Hoffman |
| 3,905,273 A | 9/1975 | Shook |
| 4,051,880 A | 10/1977 | Hestily |
| 4,085,552 A | 4/1978 | Horine et al. |
| 4,108,225 A | 8/1978 | Hestily |
| 4,143,691 A | 3/1979 | Robinson |
| 4,160,570 A | 7/1979 | Bridges |
| 4,239,428 A | 12/1980 | Berzina |
| 4,252,164 A | 2/1981 | Norlander |
| D262,185 S | 12/1981 | Huber et al. |
| 4,319,860 A | 3/1982 | Beares |
| D267,492 S | 1/1983 | Schieber |
| 4,406,568 A | 9/1983 | Rogers et al. |
| 4,410,022 A | 10/1983 | Peterson |
| 4,440,050 A | 4/1984 | Kagerer |
| 4,455,023 A | 6/1984 | Saloom |
| 4,461,330 A | 7/1984 | Judkins |
| 4,488,460 A | 12/1984 | Ballone et al. |
| 4,510,404 A | 4/1985 | Barrett et al. |
| 4,513,381 A | 4/1985 | Houser, Jr. et al. |
| 4,537,234 A | 8/1985 | Onsrud |
| D281,218 S | 11/1985 | Barrett et al. |
| 4,562,872 A | 1/1986 | Fushiya et al. |
| 4,593,466 A | 6/1986 | O'Brien |
| D286,132 S | 10/1986 | Yamamoto |
| 4,615,654 A | 10/1986 | Shaw |
| 4,636,961 A | 1/1987 | Bauer |
| 4,652,191 A | 3/1987 | Bernier |
| 4,674,548 A | 6/1987 | Mills et al. |
| 4,679,606 A | 7/1987 | Bassett |
| 4,718,468 A | 1/1988 | Cowman |
| 4,738,571 A | 4/1988 | Olson et al. |
| 4,770,573 A | 9/1988 | Monobe |
| 4,776,374 A | 10/1988 | Charlebois |
| D300,501 S | 4/1989 | Zurwelle |
| 4,830,074 A | 5/1989 | Lundblom |
| 4,872,550 A | 10/1989 | Stranges |
| D304,543 S | 11/1989 | Somers et al. |
| 4,919,176 A | 4/1990 | Gachet et al. |
| 4,924,571 A | 5/1990 | Albertson |
| 4,938,642 A | 7/1990 | Imahashi et al. |
| 5,005,617 A | 4/1991 | Michaels |
| 5,012,582 A | 5/1991 | Bristol et al. |
| 5,029,706 A | 7/1991 | McCracken |
| 5,056,375 A | 10/1991 | Kapton et al. |
| 5,062,460 A | 11/1991 | DeLine |
| 5,074,724 A | 12/1991 | McCracken |
| 5,078,557 A | 1/1992 | McCracken |
| D323,935 S | 2/1992 | Ward |
| 5,088,865 A | 2/1992 | Beth et al. |
| D326,597 S | 6/1992 | Lee |
| 5,117,879 A | 6/1992 | Payne |
| 5,139,061 A | 8/1992 | Neilson |
| 5,181,813 A | 1/1993 | McCracken |
| 5,188,492 A | 2/1993 | McCracken |
| 5,191,921 A | 3/1993 | McCurry |
| D337,501 S | 7/1993 | Witt |
| D339,048 S | 9/1993 | Baum |
| D340,174 S | 10/1993 | Hoshino et al. |
| D341,305 S | 11/1993 | Svetlik |
| 5,265,657 A | 11/1993 | Matsumoto et al. |
| 5,273,089 A | 12/1993 | Fuchs et al. |
| 5,289,861 A | 3/1994 | Hedrick |
| 5,310,296 A | 5/1994 | McCurry |
| D349,637 S | 8/1994 | Hoshino et al. |
| 5,347,684 A | 9/1994 | Jackson |
| 5,353,474 A | 10/1994 | Good et al. |
| D352,048 S | 11/1994 | Goebel |
| 5,361,851 A | 11/1994 | Fox |
| 5,368,424 A | 11/1994 | Bettenhausen |
| 5,375,636 A | 12/1994 | Bosten et al. |
| 5,429,235 A | 7/1995 | Chen |
| 5,445,479 A | 8/1995 | Hillinger |
| 5,452,751 A | 9/1995 | Engler, III et al. |
| 5,469,601 A | 11/1995 | Jackson |
| 5,503,203 A | 4/1996 | Stornetta |
| 5,511,445 A | 4/1996 | Hildebrandt |
| 5,533,843 A | 7/1996 | Chung |
| 5,584,620 A | 12/1996 | Blickhan et al. |
| 5,590,989 A | 1/1997 | Mulvihill |
| 5,598,892 A | 2/1997 | Fox |
| 5,611,378 A | 3/1997 | Brazell |
| 5,613,305 A | 3/1997 | Narrin |
| 5,613,813 A | 3/1997 | Winchester et al. |
| 5,632,578 A | 5/1997 | McCurry et al. |
| 5,640,741 A | 6/1997 | Yano |
| 5,662,440 A | 9/1997 | Kikuchi et al. |
| 5,671,789 A | 9/1997 | Stolzer et al. |
| 5,678,965 A | 10/1997 | Strick |
| 5,685,676 A | 11/1997 | Johnson |
| 5,725,036 A | 3/1998 | Walter |
| 5,725,038 A | 3/1998 | Tucker et al. |
| 5,758,702 A | 6/1998 | Adams |
| 5,803,684 A | 9/1998 | Wang |
| 5,813,805 A | 9/1998 | Kopras |
| 5,853,273 A | 12/1998 | Coffey |
| 5,853,274 A | 12/1998 | Coffey et al. |
| D407,617 S | 4/1999 | Cooper et al. |
| 5,902,080 A | 5/1999 | Kopras |
| D410,934 S | 6/1999 | Etter |
| 5,909,987 A | 6/1999 | Coffey et al. |
| 5,918,652 A | 7/1999 | Tucker |
| 5,921,730 A | 7/1999 | Young et al. |
| D416,460 S | 11/1999 | Bosten et al. |
| 5,988,241 A | 11/1999 | Bosten et al. |
| 5,993,124 A | 11/1999 | Cooper et al. |
| 5,997,225 A | 12/1999 | Young et al. |
| 5,998,897 A | 12/1999 | Bosten et al. |
| 6,048,260 A | 4/2000 | Kopras |
| 6,065,912 A | 5/2000 | Bosten et al. |
| 6,079,915 A | 6/2000 | Bosten et al. |
| 6,094,780 A | 8/2000 | McGlothlin et al. |
| 6,113,323 A | 9/2000 | Bosten et al. |
| 6,139,229 A | 10/2000 | Bosten et al. |
| D435,414 S | 12/2000 | Etter et al. |
| 6,158,930 A | 12/2000 | Etter |
| D438,086 S | 2/2001 | Ahlund |
| 6,182,723 B1 | 2/2001 | Bosten et al. |
| 6,226,877 B1 | 5/2001 | Ono |
| 6,250,859 B1 | 6/2001 | Bosten et al. |
| D444,364 S | 7/2001 | Evans |
| 6,261,036 B1 | 7/2001 | Bosten et al. |
| 6,267,238 B1 | 7/2001 | Miller et al. |
| 6,308,378 B1 | 10/2001 | Mooty et al. |
| D450,230 S | 11/2001 | Long et al. |
| 6,318,936 B1 | 11/2001 | McFarlin, Jr. et al. |
| 6,354,016 B1 | 3/2002 | Cafaro |
| 6,419,429 B1 | 7/2002 | Long et al. |
| D461,389 S | 8/2002 | Hsiao |
| D463,238 S | 9/2002 | Schoen et al. |
| 6,443,675 B1 | 9/2002 | Kopras et al. |
| 6,443,676 B1 | 9/2002 | Kopras et al. |
| 6,474,378 B1 * | 11/2002 | Ryan et al. ............ 144/154.5 |
| 6,488,455 B1 * | 12/2002 | Staebler et al. ............ 409/182 |
| D473,439 S | 4/2003 | Grant et al. |
| D479,968 S | 9/2003 | McDonald et al. |
| 6,619,894 B2 * | 9/2003 | Hathcock et al. ............ 409/182 |
| 6,725,892 B2 | 4/2004 | McDonald et al. |
| 6,863,480 B1 | 3/2005 | Taylor |
| 6,896,451 B2 * | 5/2005 | Oberheim ............ 409/131 |
| 6,951,232 B2 | 10/2005 | McDonald et al. |
| 6,991,008 B2 | 1/2006 | McDonald et al. |
| 7,207,362 B2 | 4/2007 | McDonald et al. |
| 7,290,575 B2 * | 11/2007 | Freese et al. ............ 144/136.95 |
| D565,380 S | 4/2008 | Rinner |
| 7,370,679 B2 | 5/2008 | McDonald et al. |
| 7,387,324 B1 | 6/2008 | Sharpe |
| 2002/0043296 A1 | 4/2002 | Daniels et al. |
| 2002/0164223 A1 | 11/2002 | Ryan et al. |
| 2003/0101592 A1 | 6/2003 | DeBolt |

| | | | | | |
|---|---|---|---|---|---|
| 2003/0135956 | A1 | 7/2003 | Gunthardt | 2008/0276430 A1 11/2008 Sharpe | |
| 2004/0035495 | A1 | 2/2004 | Hessenberger et al. | | |
| 2004/0052600 | A1 | 3/2004 | Pientka et al. | FOREIGN PATENT DOCUMENTS | |
| 2004/0200543 | A1 | 10/2004 | McDonald et al. | DE 4119325 | 12/1992 |
| 2005/0079025 | A1 | 4/2005 | Oberheim | EP 1238767 | 10/2006 |
| 2005/0189039 | A1 | 9/2005 | McDonald et al. | GB 1452163 | 10/1976 |
| 2006/0118205 | A1 | 6/2006 | McDonald et al. | GB 2062361 | 5/1981 |
| 2006/0147286 | A1 | 7/2006 | Cooper et al. | | |
| 2006/0249227 | A1 | 11/2006 | McDonald et al. | * cited by examiner | |
| 2008/0173645 | A1 | 7/2008 | Burstein et al. | | |

PLUNGE ROUTER AND KIT

RELATED APPLICATIONS

This application claims priority to U.S. Provisional Patent Application Ser. No. 60/965,373 filed on Aug. 20, 2007, the entire content of which is incorporated herein by reference.

FIELD OF THE INVENTION

The present invention relates to hand-held power tools and kits, and, more particularly, to routers and router kits.

BACKGROUND OF THE INVENTION

A variety of routers exist in today's marketplace. Such routers include both fixed base routers and plunge routers. Some of these existing routers include a base and a motor assembly removably connected to the base. The motor assembly includes external threads and the interior surface of the base includes complementary internal threads for receiving the external threads of the motor assembly. To connect the motor assembly to the base for these existing routers, one must align the external threads of the motor assembly with the internal threads of the base, and, then, the motor assembly must be rotated to thread the motor assembly into the base. This aligning and rotating procedure is cumbersome and time consuming. Also, many of these existing routers are powered by an AC power source, thereby requiring the use of an AC power cord coupled to the motor assembly. Rotation of the motor assembly in the above described manner wraps and tangles the AC power cord around the router or the user's hands or arms, thereby inhibiting connection of the motor assembly to the base.

Some existing router combinations include a removable motor assembly that can be supported by either a fixed router base or a plunge router base. Such combinations require that each of the fixed router base and the plunge router base include their own separate and individual depth adjustment mechanism. When the motor assembly is supported by the fixed router base, the depth adjustment mechanism on the fixed router base controls a depth of cut of the tool element. Similarly, when the motor assembly is supported by the plunge router base, the depth adjustment mechanism on the plunge router base controls a depth of cut of the tool element. Accordingly, many components are required to ensure control of the depth of cut of the tool element when connected to multiple bases.

Existing plunge routers commonly include a first base portion engageable with a workpiece, a second base portion vertically movable relative to the base portion, a motor assembly supported by and vertically movable with the second base portion, and a depth stop rod supported by the second base portion and engageable with the first base portion when the second base portion is moved downward toward the first base portion. The motor assembly includes a motor and supports the tool element. The depth stop rod controls a depth of cut of the plunge router by engaging the first base portion when the router is plunged downward. The depth of cut for such plunge routers is only adjusted in a coarse manner. That is, a user typically unscrews a lock member to disengage the locking member from the depth stop rod. Once disengaged, a user manually grasps the depth stop rod and coarsely moves the depth stop rod. When the desired position of the depth stop rod is achieved, the user re-screws the lock member to again engaged the depth stop rod and secure the depth stop rod in position. Accordingly, the depth of cut of typical plunge routers is only coarsely adjustable. Coarse adjustment of a depth of cut is imprecise and commonly results in undesired depths of cut.

Accordingly, a need exists for a plunge router and a kit that satisfy at least these and other deficiencies of conventional routers.

SUMMARY OF THE INVENTION

In some aspects and in some constructions, a hand-held power tool, such as, for example, a router, is provided and may include a motor housing assembly and a plunge base. The plunge base may be adapted to support the motor housing assembly in the plunge base. The motor housing assembly may also be supported in and used with a fixed router base.

In some aspects and in some constructions, a kit is provided and includes a first router base, a second router base separate from the first router base, a motor assembly interchangeably supported by the first router base and the second router base, the motor assembly including a motor for driving a tool element and a motor housing supporting the motor, and a depth adjustment mechanism at least partially supported by the motor assembly, wherein the depth adjustment mechanism cooperates with the first router base when the motor assembly is supported by the first router base to adjust a plunge depth of the tool element relative to the first router base and cooperates with the second router base when the motor assembly is supported by the second router base to adjust a plunge depth of the tool element relative to the second router base.

In some aspects and in some constructions, a hand-held power tool, such as, for example, a router, may include a depth adjustment mechanism. The depth adjustment mechanism may be operable to adjust the maximum depth of cut of the router. The depth adjustment mechanism may be operable to provide both fine and course adjustment of the maximum depth of cut.

In some aspects and in some constructions, a plunge router is provided and includes a base, a motor assembly supported by the base, the motor assembly including a motor for driving a tool element and a motor housing for supporting the motor, and a depth adjustment mechanism supported by at least one of the base and the motor assembly, the depth adjustment mechanism including an actuator movable to finely adjust a plunge depth of the tool element.

In some aspects and in some constructions, a hand-held power tool, such as, for example, a router, may include a plunge base including a depth stop rod. The router may include a motor assembly including a depth adjustment shaft. In some aspects and in some constructions, the depth adjustment shaft may engage components of the plunge base to provide fine and course adjustment of the position of the depth stop rod.

In some aspects and in some constructions, a router is provided and includes a base including an opening, and a motor assembly including a motor and a motor housing for supporting the motor, the motor assembly being removably supported by the base such that the motor housing is insertable into and removable from the opening of the base along a substantially linear path.

In some aspects and in some constructions, a router is provided and includes a base including a connector, the connector operable to connect a dust chute and an edge guide to the base, and a motor assembly supported by the base, the motor assembly including a motor for driving a tool element.

Other aspects of the invention will become apparent by consideration of the detailed description, claims, and accompanying figures.

Before any embodiments of the invention are explained in detail, it is to be understood that the invention is not limited in its application to the details of construction and the arrangement of components set forth in the following description or illustrated in the figures. The invention is capable of other embodiments and of being practiced or of being carried out in various ways. Also, it is to be understood that the phraseology and terminology used herein is for the purpose of description and should not be regarded as limiting.

Although references are made below to directions, such as left, right, up, down, top, bottom, front, rear, forward, back, etc., in describing the figures, the references are made relative to the figures (as normally viewed) for convenience. These directions are not intended to be taken literally or to limit the present invention in any form. In addition, terms such as "first," "second," and "third" are used herein for purposes of description and are not intended to indicate or imply relative importance or significance.

DETAILED DESCRIPTION

Figure 1:
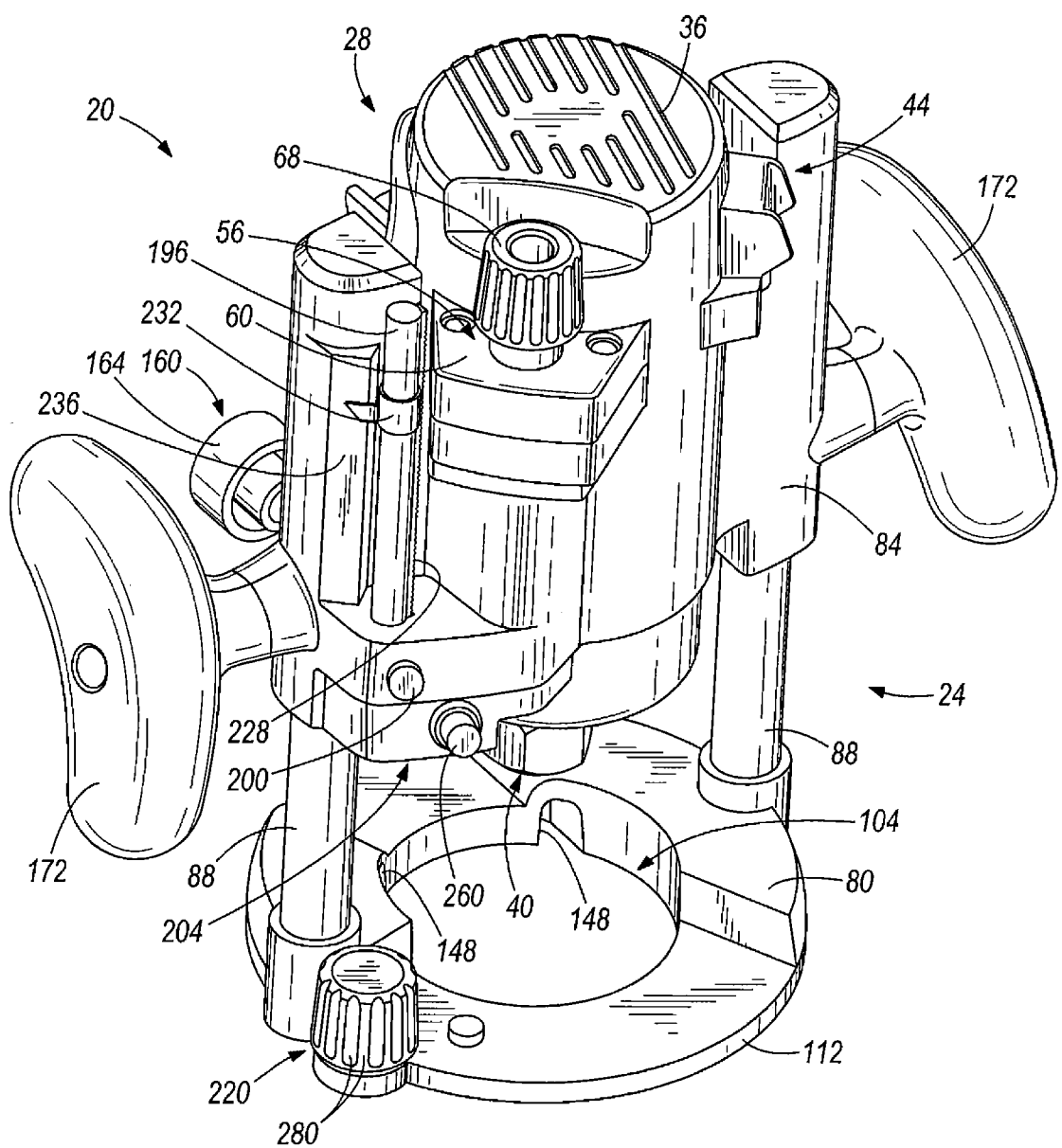
FIG. 1 is a top perspective view of a router embodying at least one aspect of the invention.
Figure 2:
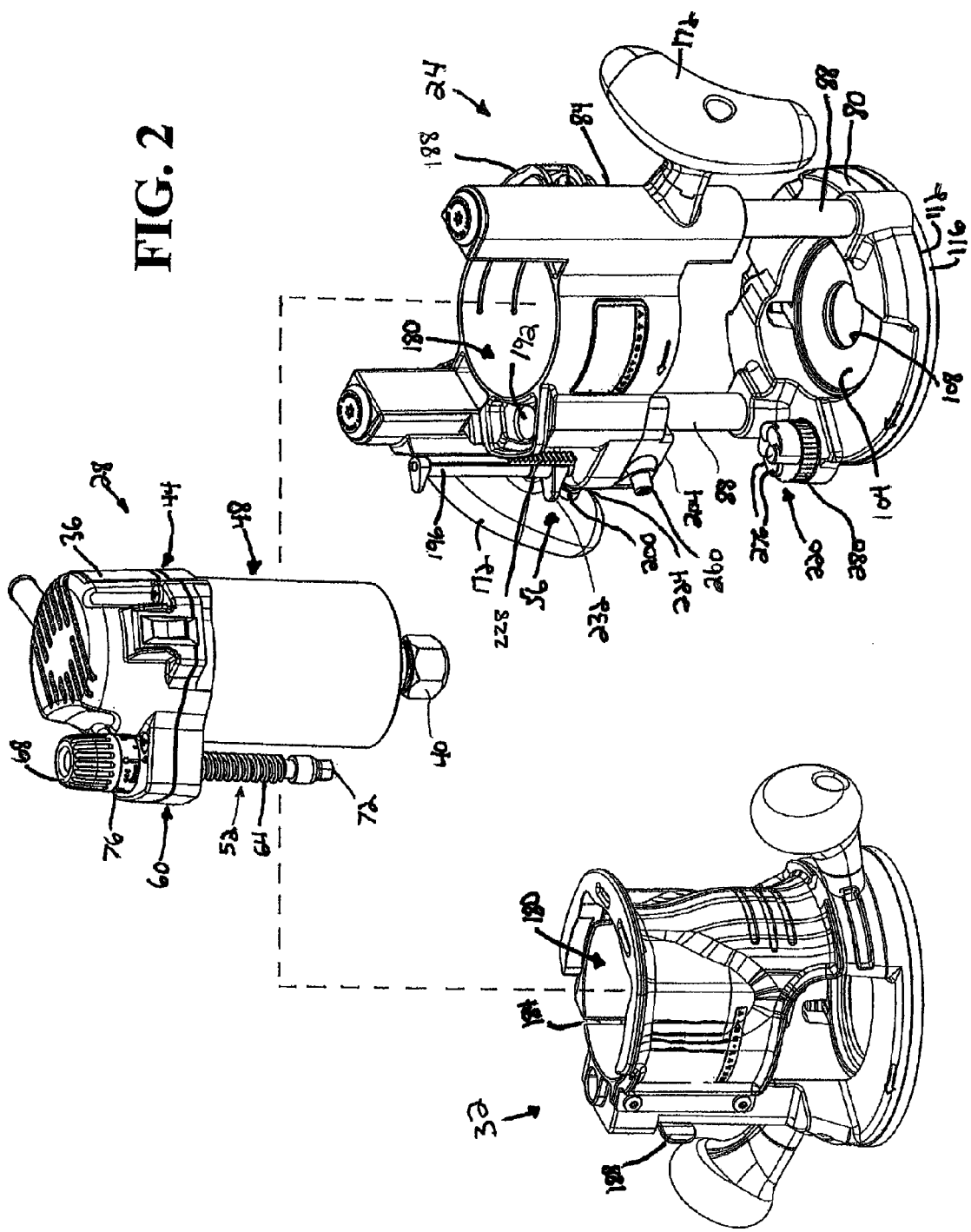
FIG. 2 is top perspective view of a kit embodying at least one aspect of the invention.
Figure 3:
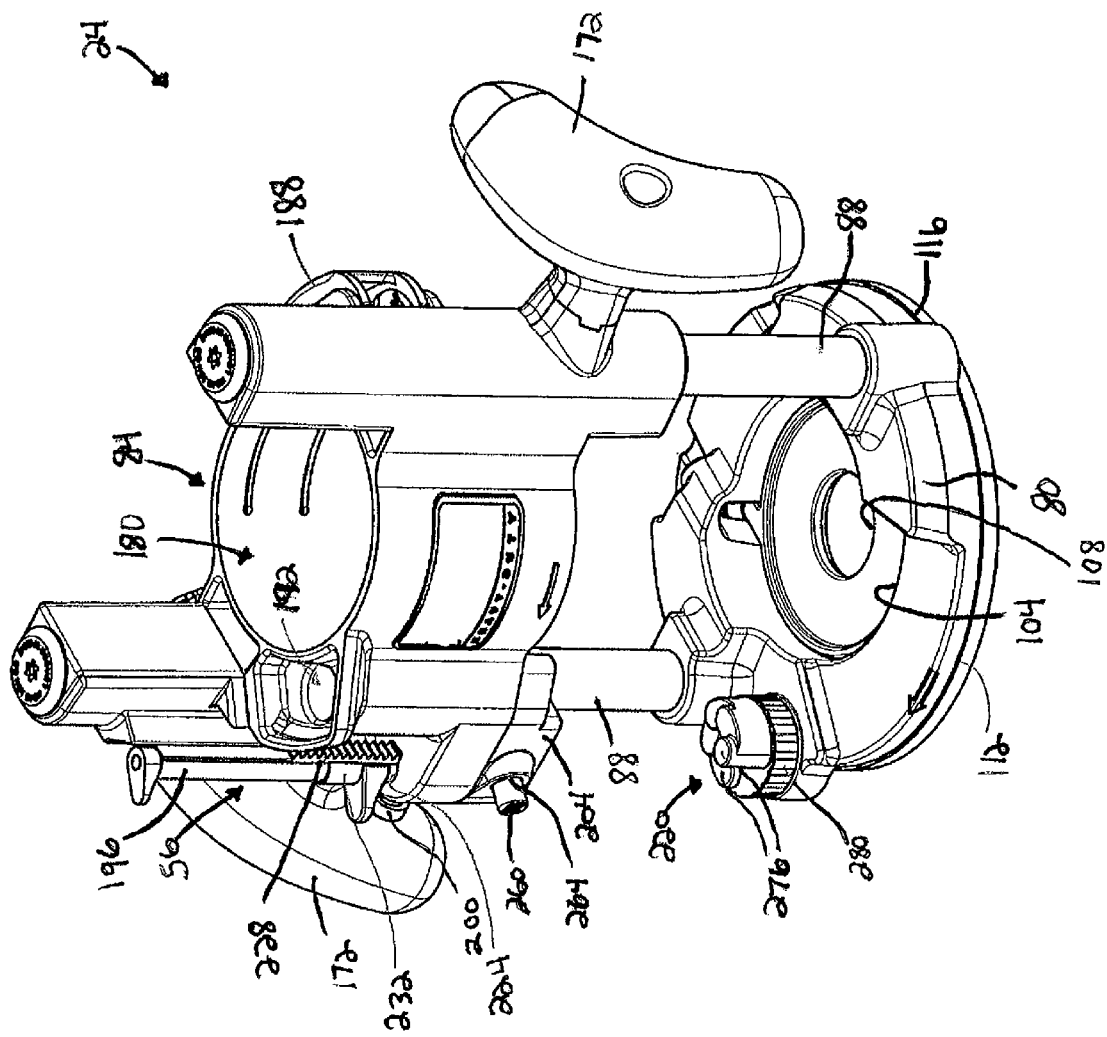
FIG. 3 is a top perspective view of a router base of the router illustrated in FIG. 1.
Figure 4:
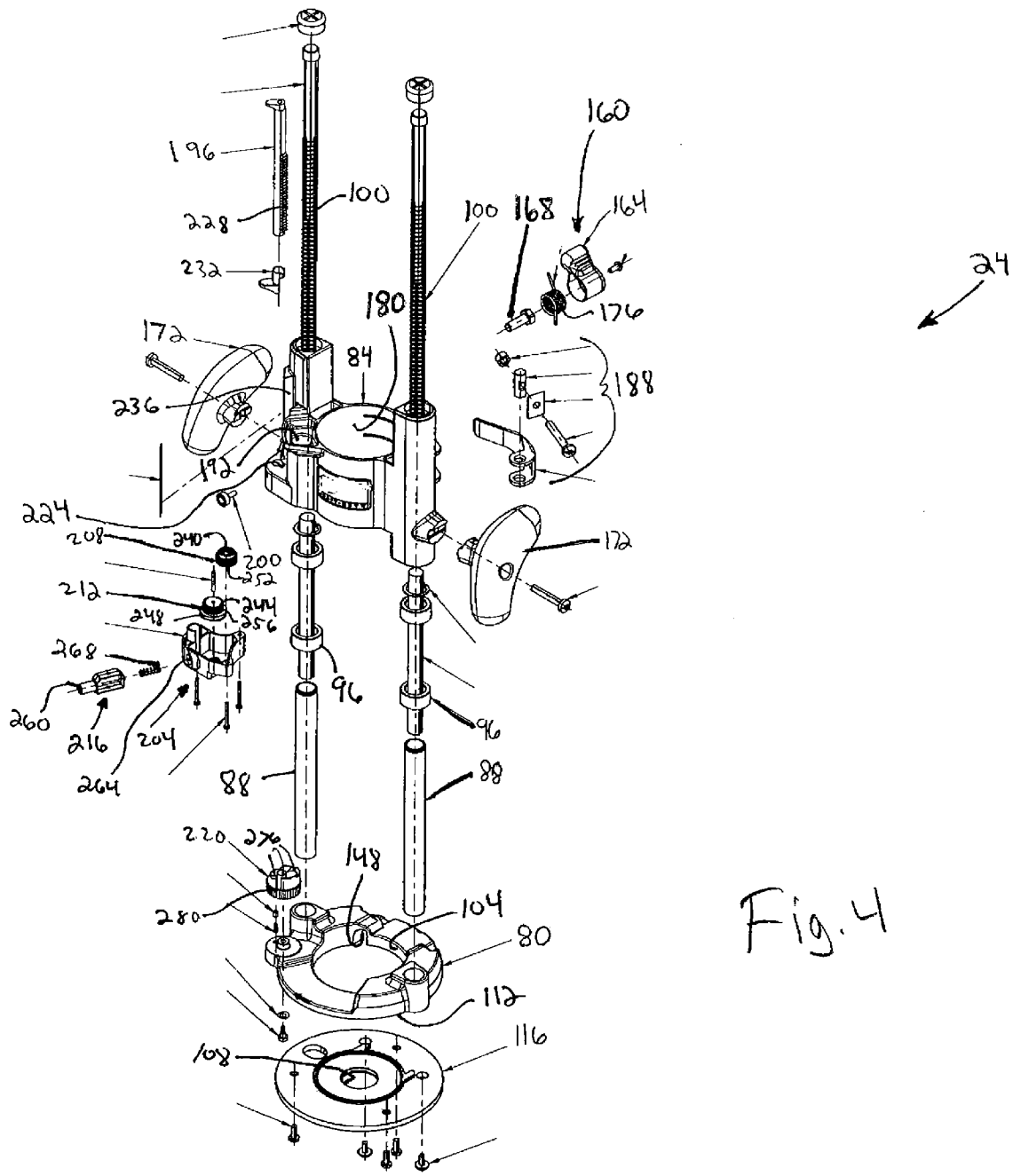
FIG. 4 is an exploded view of the router base illustrated in FIG. 3.
Figure 5:
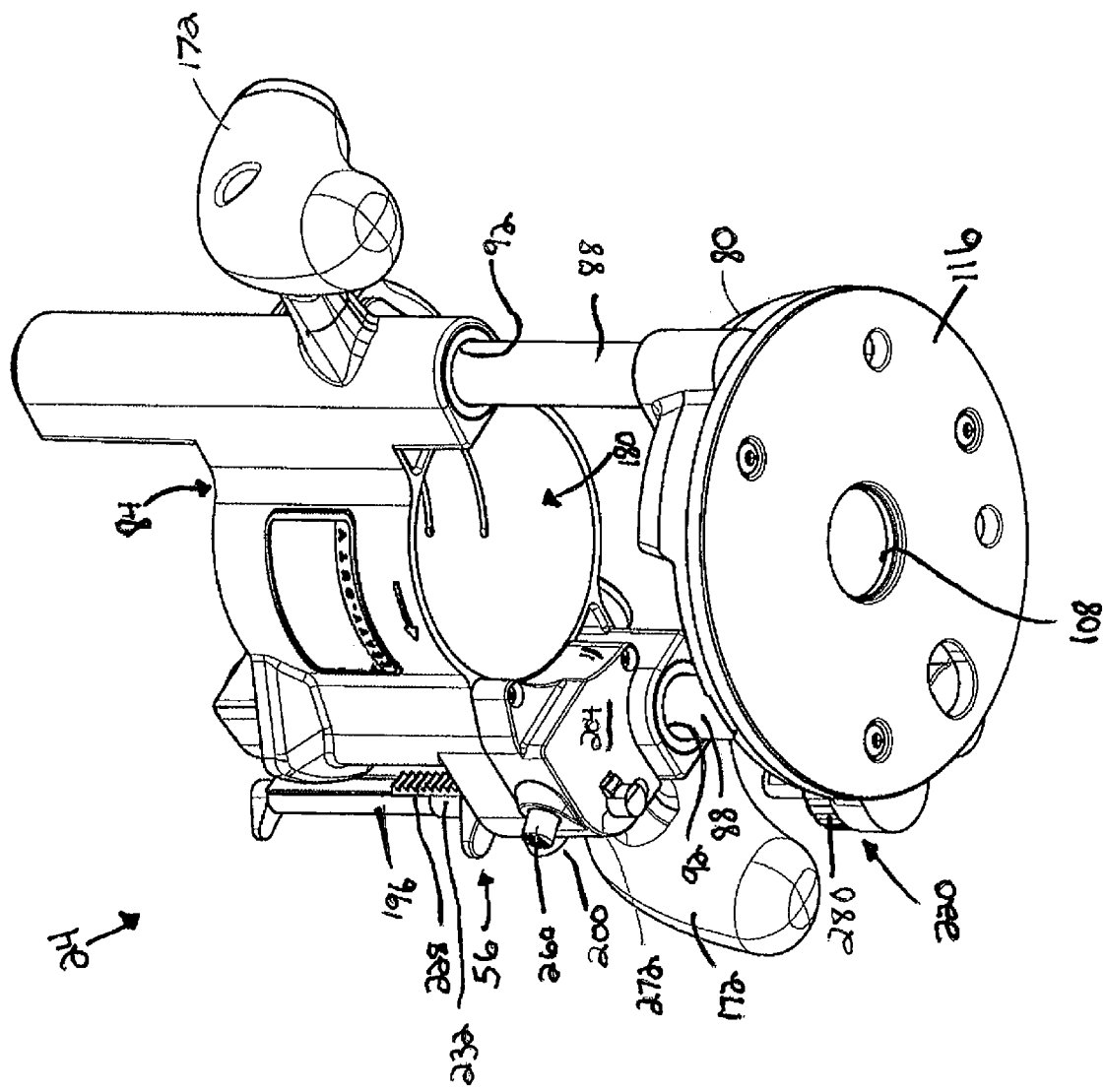
FIG. 5 is a bottom perspective view of the router base illustrated in FIG. 3.
Figure 6:
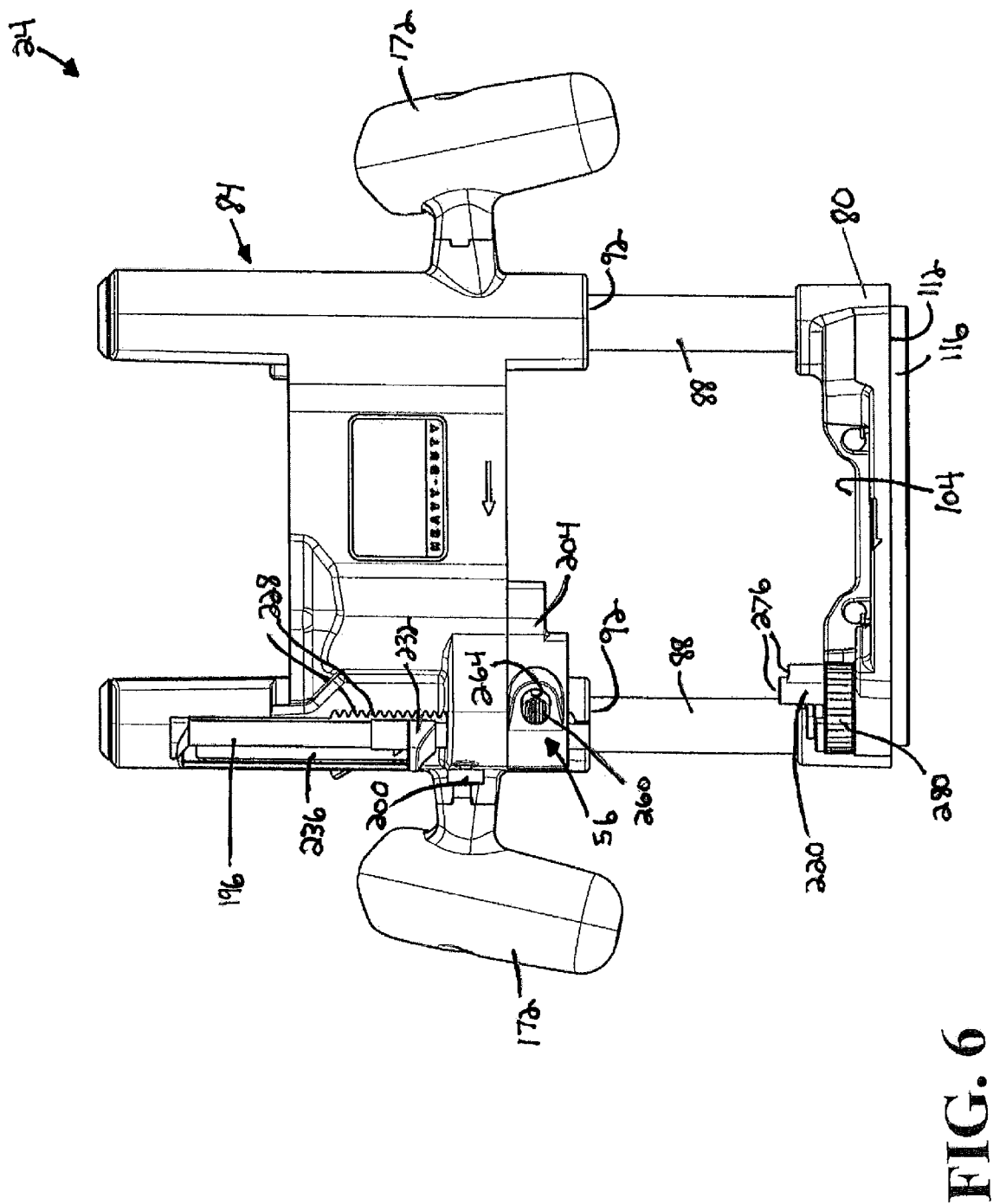
FIG. 6 is a front view of the router base illustrated in FIG. 3.
Figure 7:
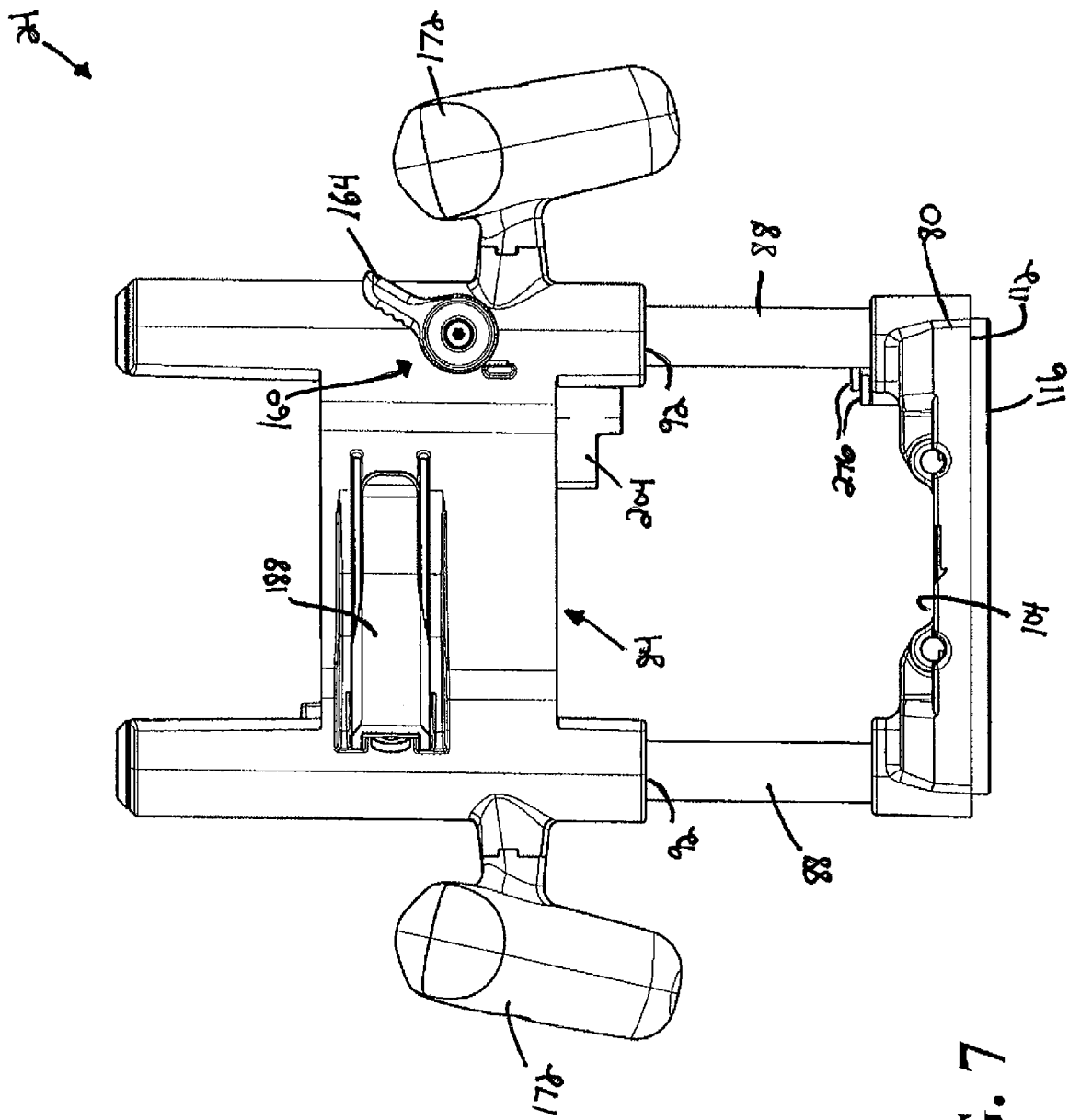
FIG. 7 is a rear view of the router base illustrated in FIG. 3.
Figure 8:
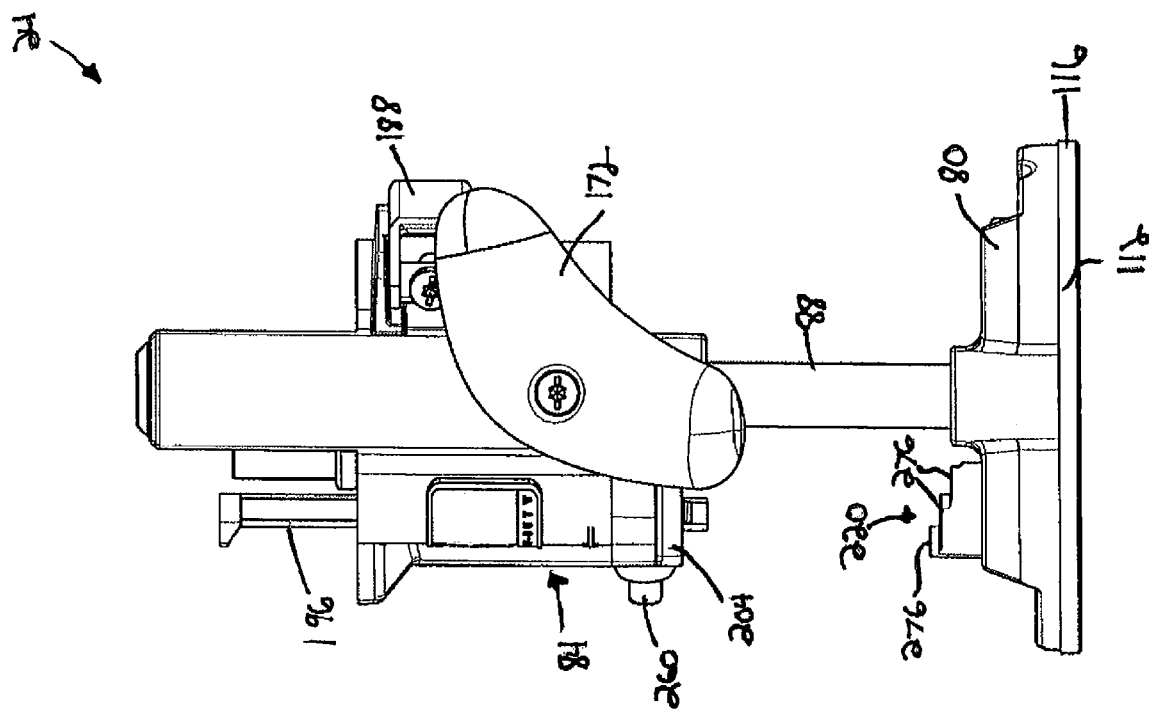
FIG. 8 is a right side view of the router base illustrated in FIG. 3.
Figure 9:
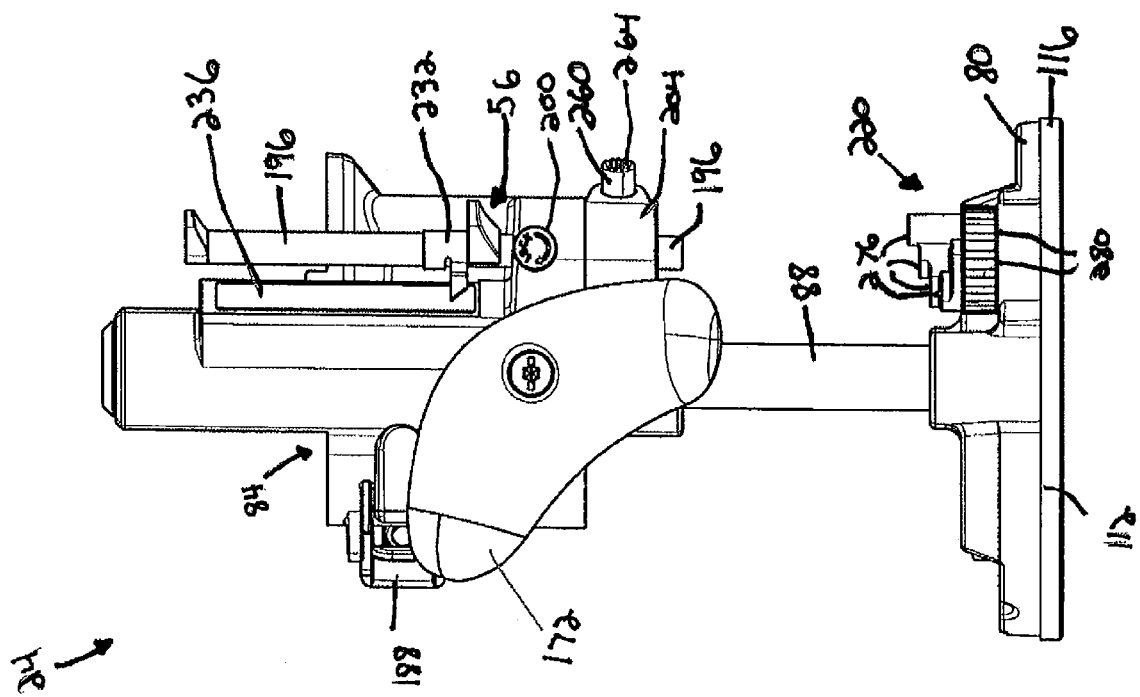
FIG. 9 is a left side view of the router base illustrated in FIG. 3.
Figure 10:
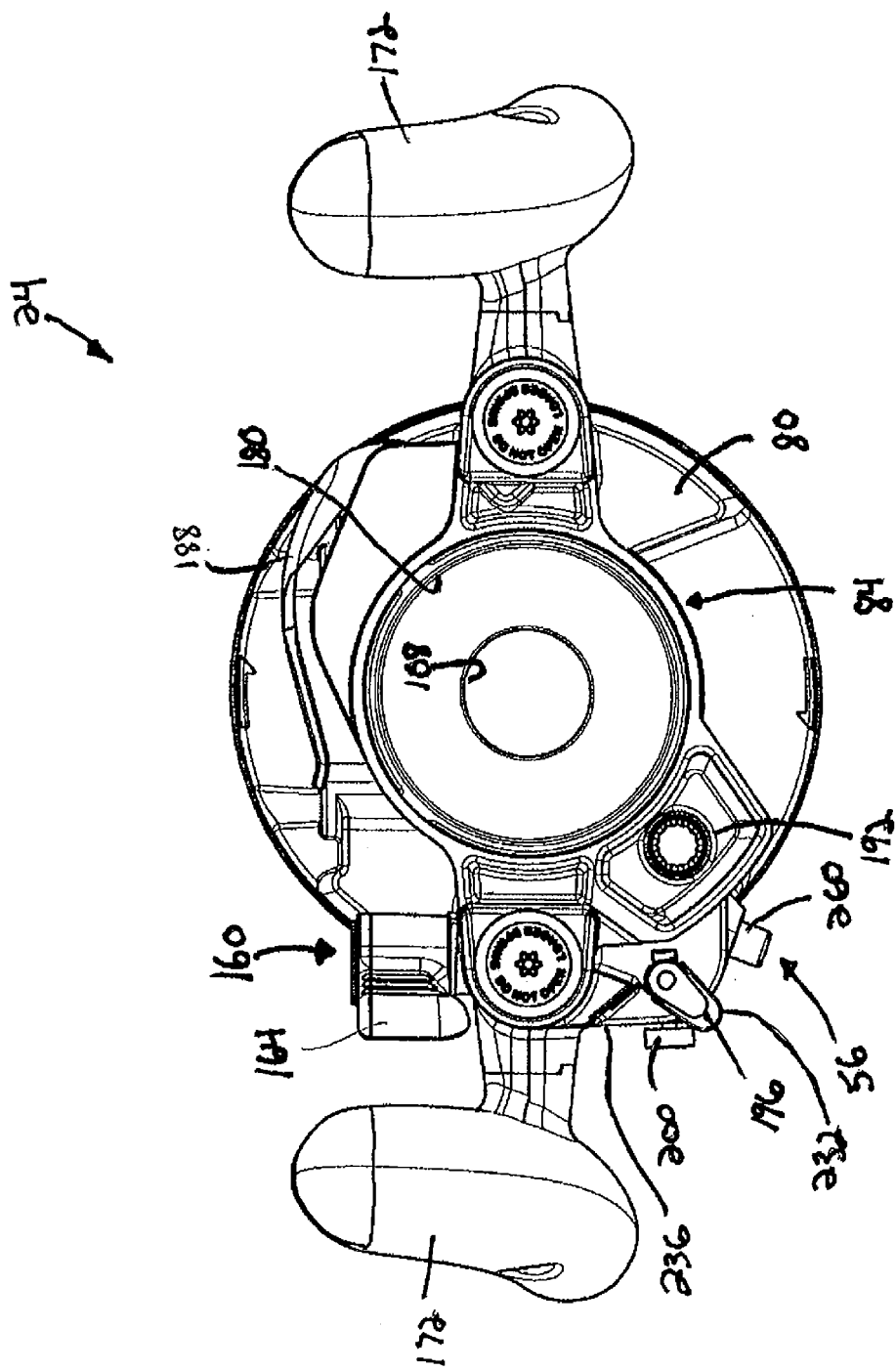
FIG. 10 is a top view of the router base illustrated in FIG. 3.
Figure 11:
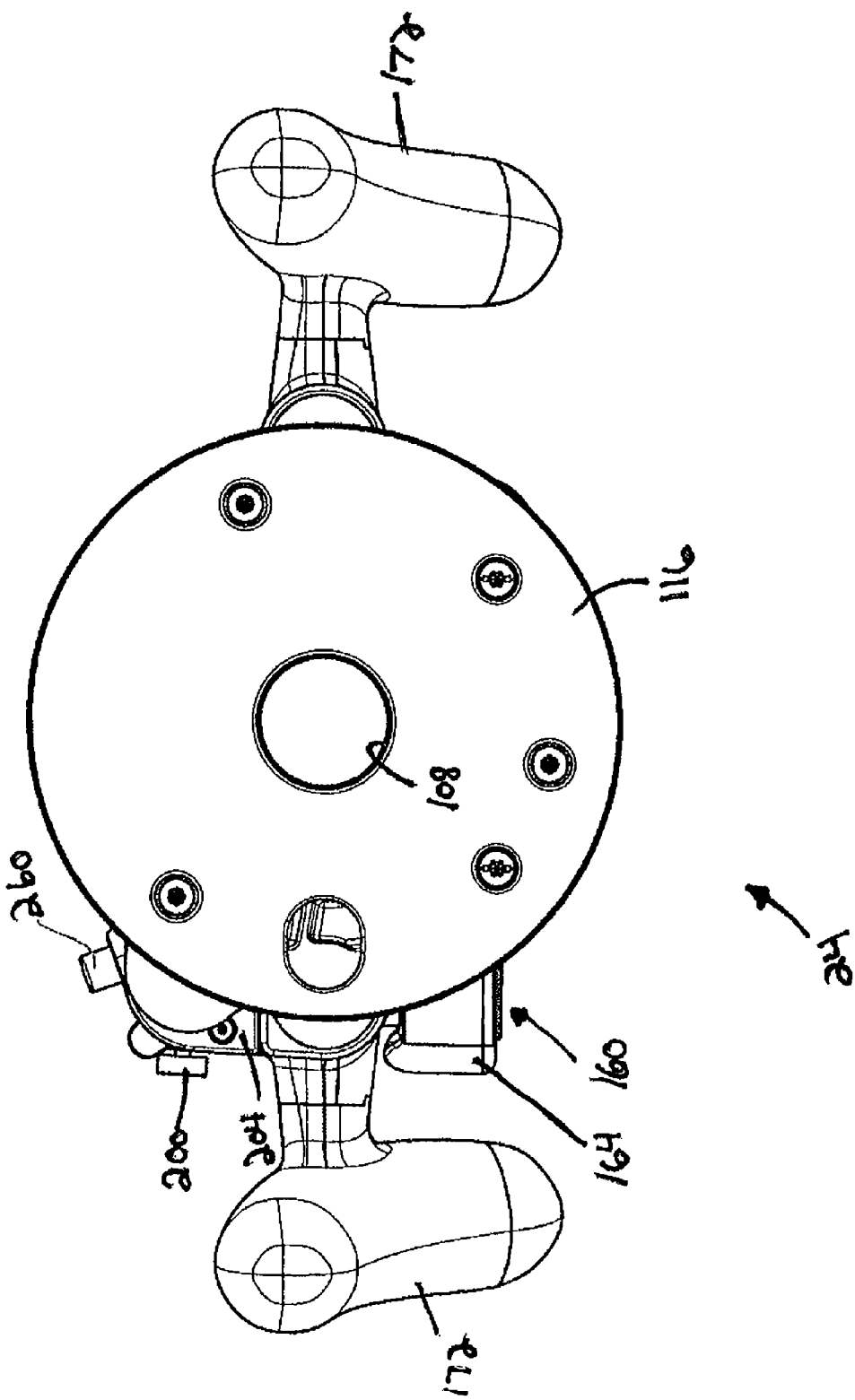
FIG. 11 is a bottom view of the router base illustrated in FIG. 3.
Figure 12:
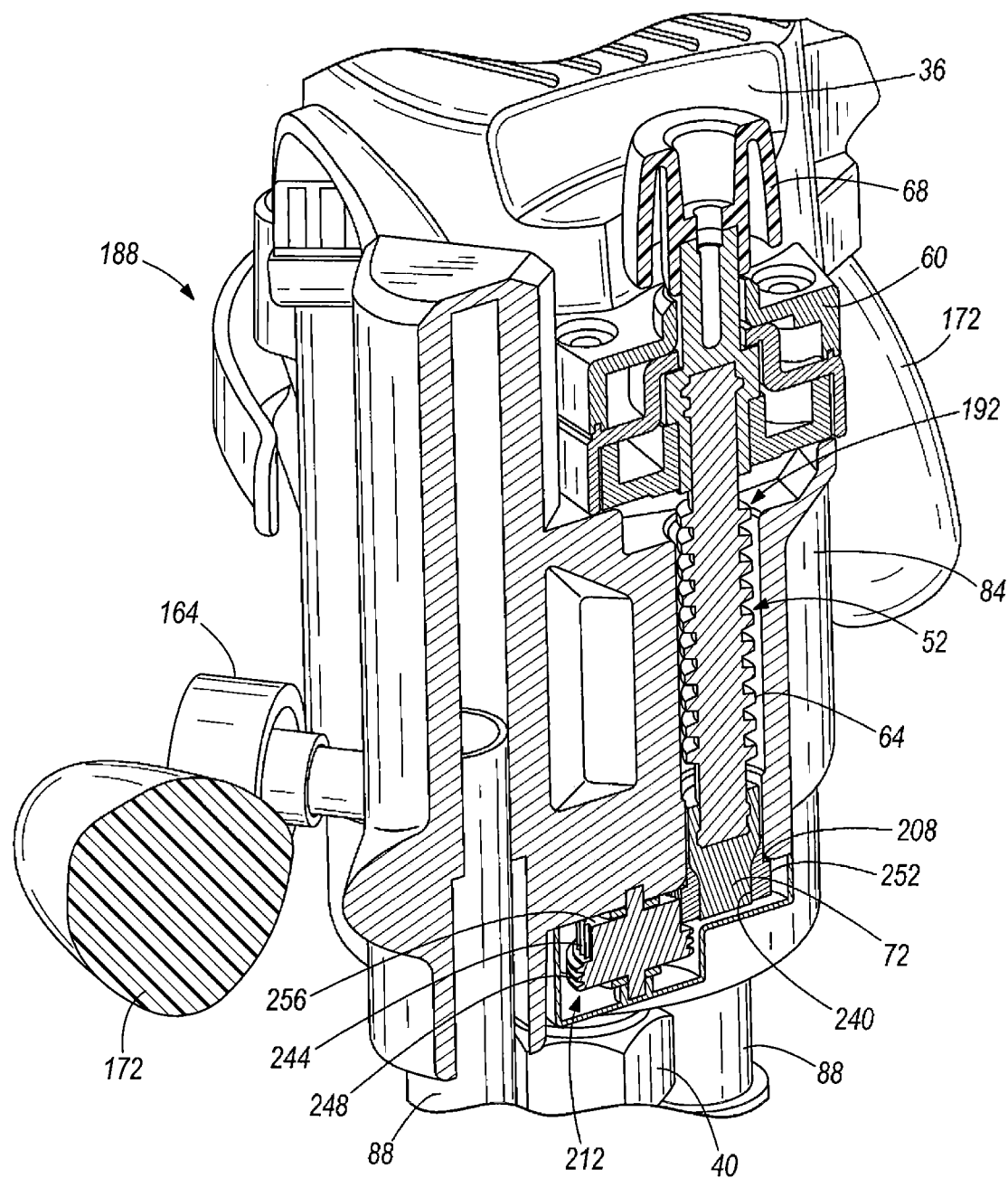
FIG. 12 is a cross-sectional view of a portion of the router base illustrated in FIG. 3, shown with a motor housing connected to the router base.

A router 20 embodying at least some of the aspects of the invention is illustrated in FIG. 1. The router 20 includes a plunge base 24 and a motor housing assembly 28 removably supported by the plunge base 24. With reference to FIG. 2, the motor housing assembly 28 is removable from the plunge base 24 and is supportable by and usable with a fixed router base 32. The motor housing assembly 28 is interchangeable between the plunge router base 24 and the fixed router base 32 to provide a router kit (described in more detail below). The construction and operation of the motor housing assembly 28, the construction and operation of the fixed router base 32, and the use of the motor housing assembly 28 with the fixed router base 32 may be similar to that shown and described in U.S. Pat. No. 6,725,892, issued Apr. 27, 2004; U.S. Design Pat. No. D487,009, issued Feb. 24, 2004; published U.S. Patent Application No. 2004/0035495, filed Aug. 20, 2003; and published U.S. Patent Application No. 2007/0095429, filed Dec. 5, 2006; the entire contents of which are hereby incorporated by reference.

Referring now to FIGS. 1 and 2, the motor housing assembly 28 supports a motor 36 and associated components. The motor 36 can be electrically connected to a variety of power sources, such as an AC or DC power source. The motor 36 includes an output shaft, and a tool holder 40 is connected to or formed with the shaft and is adapted to support a tool element. In the illustrated construction, the tool holder 40 is a collet. In other constructions, the tool holder 40 can be any other device or structure suitable to support a tool element for this type of application. The motor 36 is operable to rotate the tool element to cut a workpiece.

The motor housing assembly 28 is generally vertically oriented and includes an upper housing portion 44 and a lower housing portion 48. The lower housing portion 48 has a generally cylindrical outer surface and is adapted to be removably inserted into either the plunge base 24 or the fixed base 32. The motor housing assembly 28 also includes a depth adjustment shaft 52, which is also part of a depth adjustment mechanism 56, as described in greater detail below. The upper housing portion 44 includes a generally vertically-oriented aperture that extends completely through a protruding section 60 of the upper housing portion 44. The depth adjustment shaft 52 is generally vertically oriented and extends through the vertically-oriented aperture in the upper housing portion 44 so that portions of the depth adjustment shaft 52 extend above and below the top and bottom surfaces of the protruding section 60, respectively. The depth adjustment shaft 52 is generally vertically fixed, but is rotatable relative to the upper and lower housing portions 44, 48. The depth adjustment shaft 52 includes a threaded portion 64, and a depth adjustment knob 68 is attached to an upper end of the depth adjustment shaft 52. The depth adjustment knob 68 is also part of the depth adjustment mechanism 56. The lower end 72 of the depth adjustment shaft 52 has a non-circular cross-section, and is illustrated herein as having a hexagonal cross-section. In addition, an annular position indication ring 76, imprinted or otherwise marked with position-indicating markings, can be positioned between the depth adjustment knob 68 and the top surface of the protruding section 60 so that the position indication ring 76 surrounds the depth adjustment shaft 52. The position indication ring 76 can be attached to the motor housing assembly 28 in any manner and can be fixed relative to the depth adjustment shaft 52, rotatable with the depth adjustment shaft 52, rotatable relative to the depth adjustment shaft 52, or both rotatable with the depth adjustment shaft 52 and relative to the depth adjustment shaft 52. In other constructions, the depth adjustment knob 68 can be imprinted or otherwise marked with position-indicating markings similar to the markings on the ring 76. In still other constructions, the top surface of the protruding section 60 can be imprinted or otherwise marked with position-indicating markings similar to the markings on the ring 76. In still other constructions, both the depth adjustment knob 68 and the top surface of the protruding section 60 can be imprinted or otherwise marked with position-indicating markings similar to the markings on the ring 76.

Referring now to FIGS. 1-12, the plunge base 24 includes a lower base portion 80 and a base support component 84. At least two guide posts 88 are coupled to the lower base portion 80 and extend substantially vertically upward from the lower base portion 80. The guide posts 88 are received in guide channels 92 formed in the base support component 84, and the base support component 84 is vertically movable along the guide posts 88 relative to the lower base portion 80. Bushings 96 assist in the movement of the base support component 84 along the guide posts 88. In some constructions, two tight fitting bushings 28 can be positioned within each guide channel 92 to allow movement of the base support component 84 along the guide posts 88. In other constructions, any other number of bushings can be used. In still other constructions, any other device or structure can be used instead of bushings to assist in the movement of the base support component 84. The base support component 84 and lower base portion 80 are biased away from each other by at least one spring element 100 or other biasing member positioned in at least one of the guide channels 92.

The lower base portion 80 includes a recess 104 and an opening 108 defined in a bottom of the recess 104 configured to allow the tool element to pass through the lower base portion 80 and contact a workpiece. A bottom surface 112 of the lower base portion 80 is engageable with a work surface, such as the surface of a workpiece. In the illustrated construction, the lower base portion 80 is coupled to a sub-base or base plate 116 designed to interface with a work surface, such as the surface of a workpiece. In other constructions, the lower base portion 80 can be mounted to an underside of a work bench or support surface to provide a router table operation.

The construction and operation of the sub-base and the mounting of the router to an underside of a work bench or support surface may be similar to that shown and described in U.S. Pat. No. 6,725,892, issued Apr. 27, 2004; U.S. Design Pat. No. D487,009, issued Feb. 24, 2004; published U.S. Patent Application No. 2004/0035495, filed Aug. 20, 2003; and published U.S. Patent Application No. 2007/0095429, filed Dec. 5, 2006; the entire contents of which are hereby incorporated by reference. In some constructions, additional components can be coupled to the lower base portion 80 or the sub-base 116 to help keep at least some dust and other debris in generally confined areas.

With reference to FIGS. 13-24, a dust chute 120 is coupled to the lower base portion 80 to remove dust and other debris from the cutting area during operation. The dust chute 120 includes a body 124, a fastener or connection rod 128, and an exhaust port 132 extending from the body 124. An aperture 136 is defined in the body 124 to allow the tool element to pass through the dust chute 120 during router operation without interference. The body 124 also includes a pair of channels or connectors 140 extending vertically upward from the body 124 and being operable to removably receive respective ends of the connection rod 128. In the illustrated construction, the connection rod is U-shaped and includes two ends, one end removably positionable in each of the connectors 140. The exhaust port 132 includes a coupling 144 at an end distal from the body 124. A hose, tubing, or other device is coupled to the coupling 144 at one end and coupled to a vacuum source at the other end thereof to facilitate removal of debris from the work area.

Figure 13:
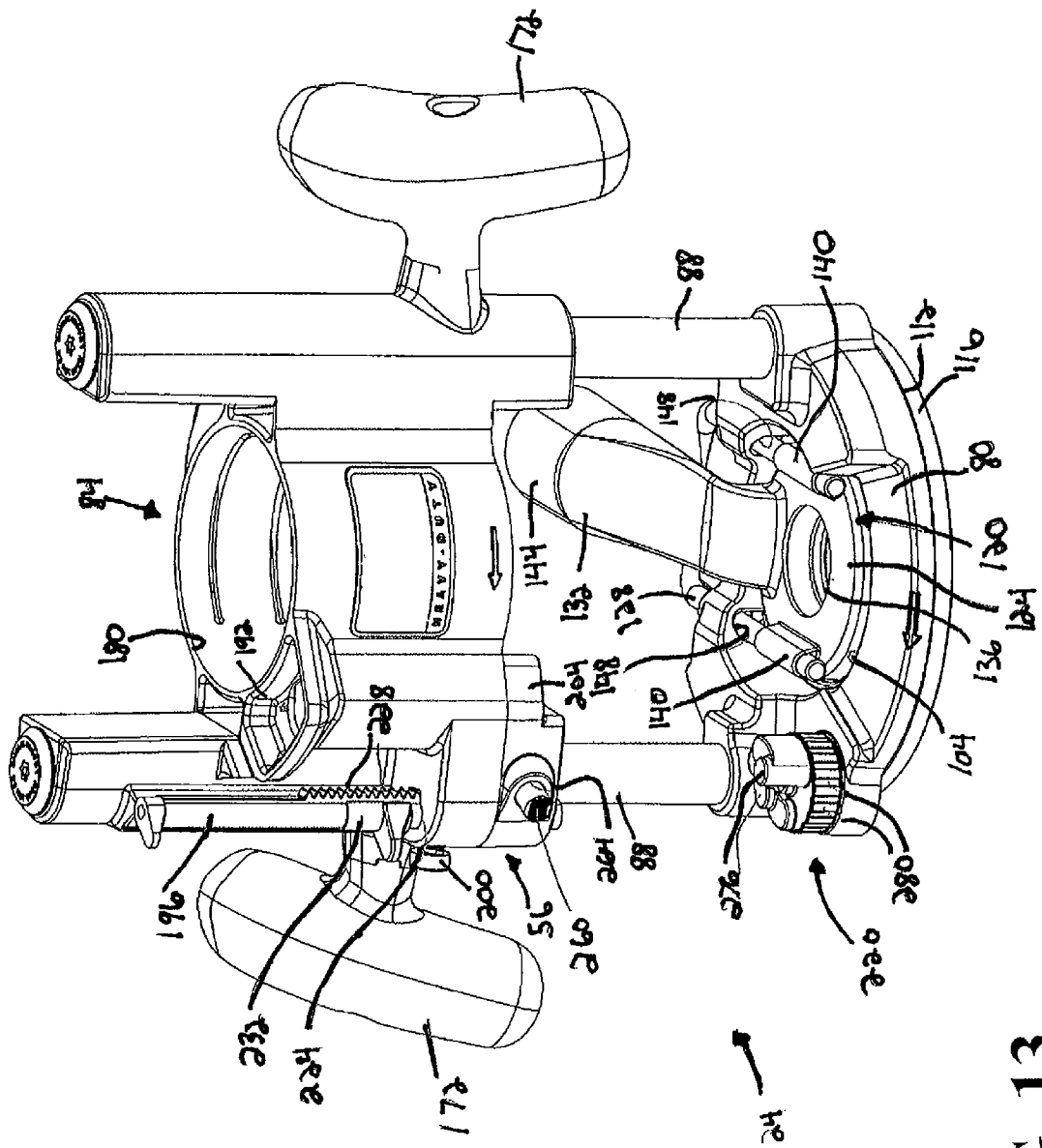
FIG. 13 is top perspective view of the router base illustrated in FIG. 3, shown with a dust chute connected to the router base.
Figure 14:
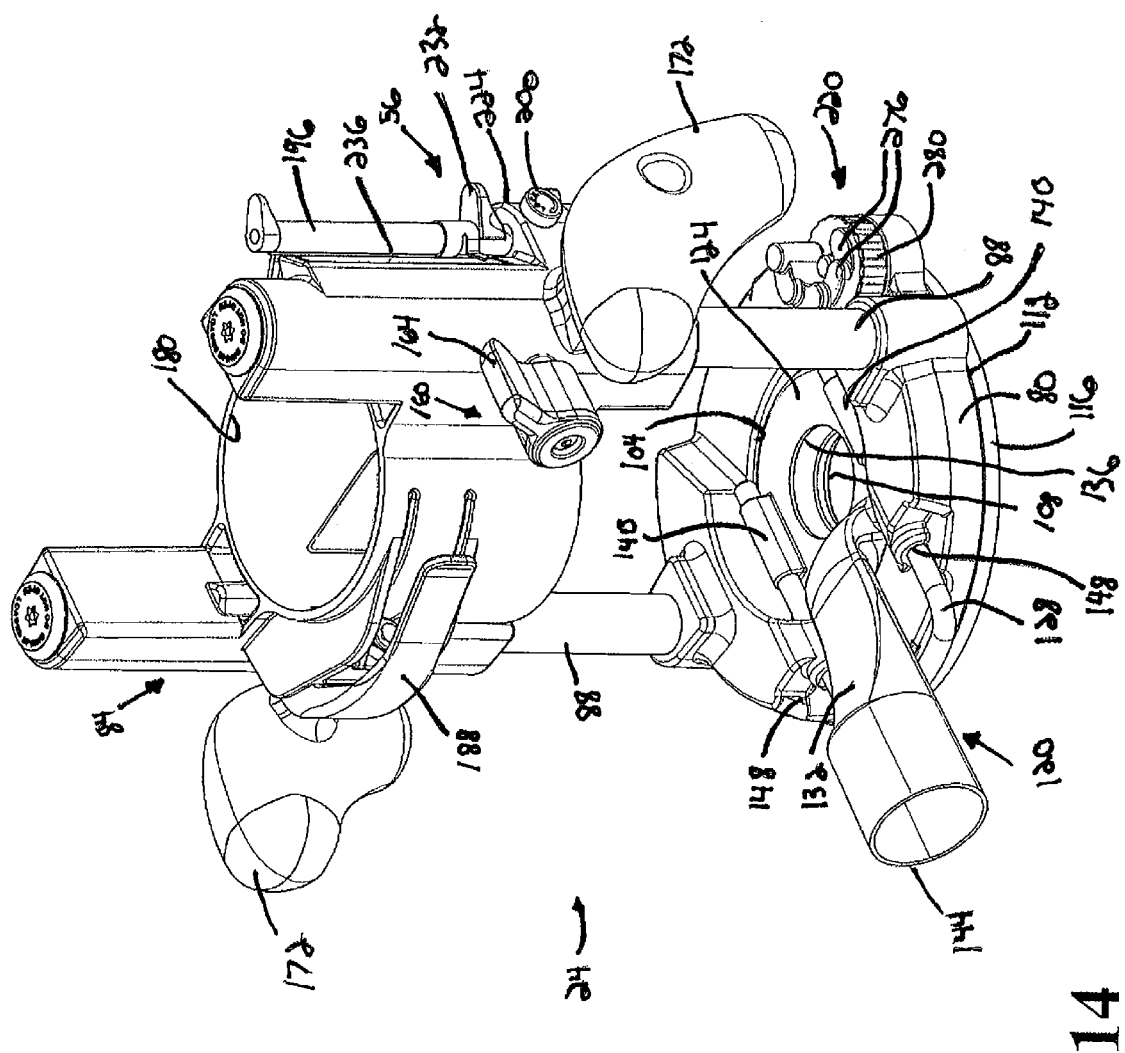
FIG. 14 is a bottom perspective view of the router base and dust chute illustrated in FIG. 13.
Figure 15:
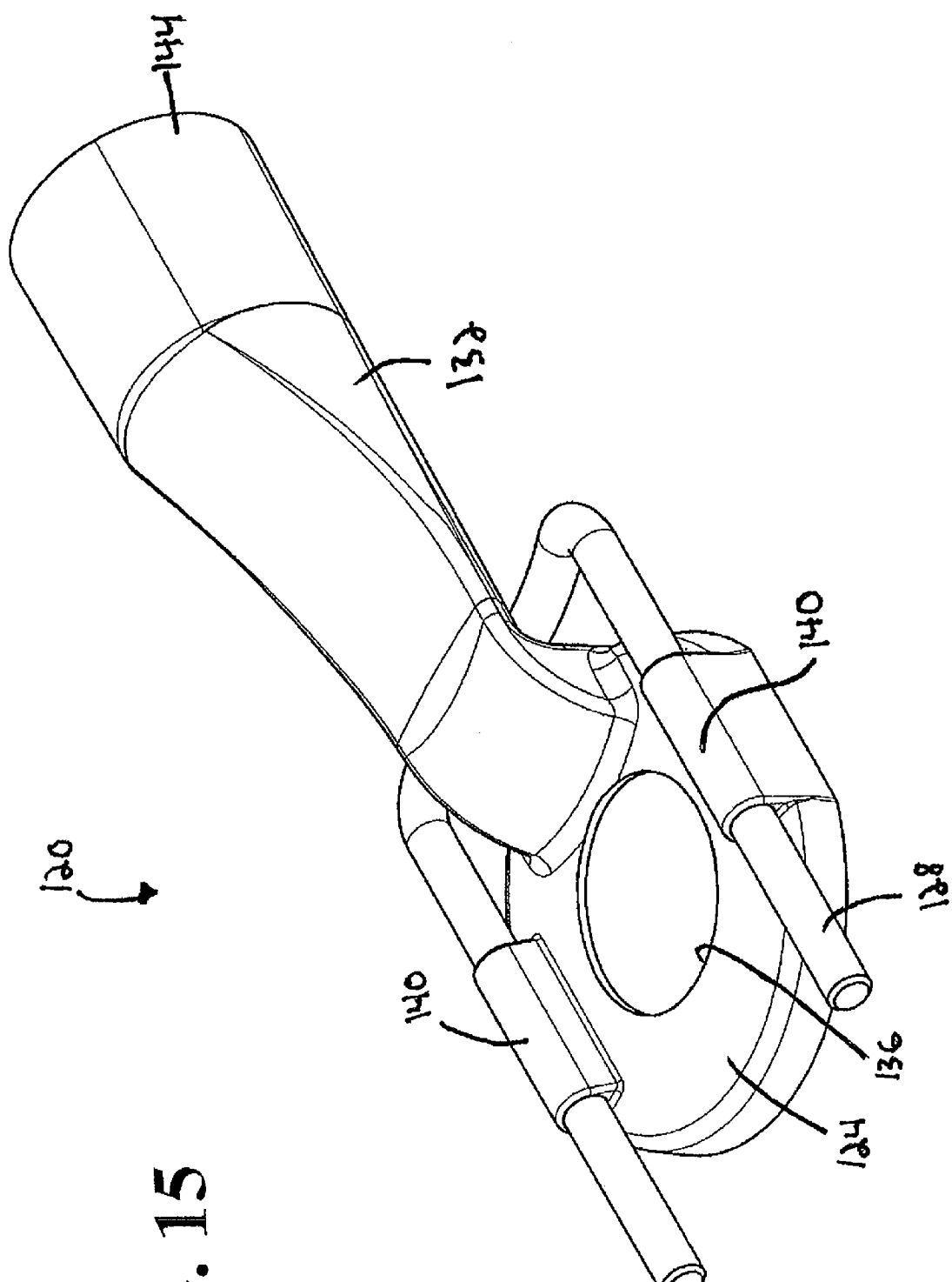
FIG. 15 is a top perspective view of the dust chute illustrated in FIG. 13.
Figure 16:
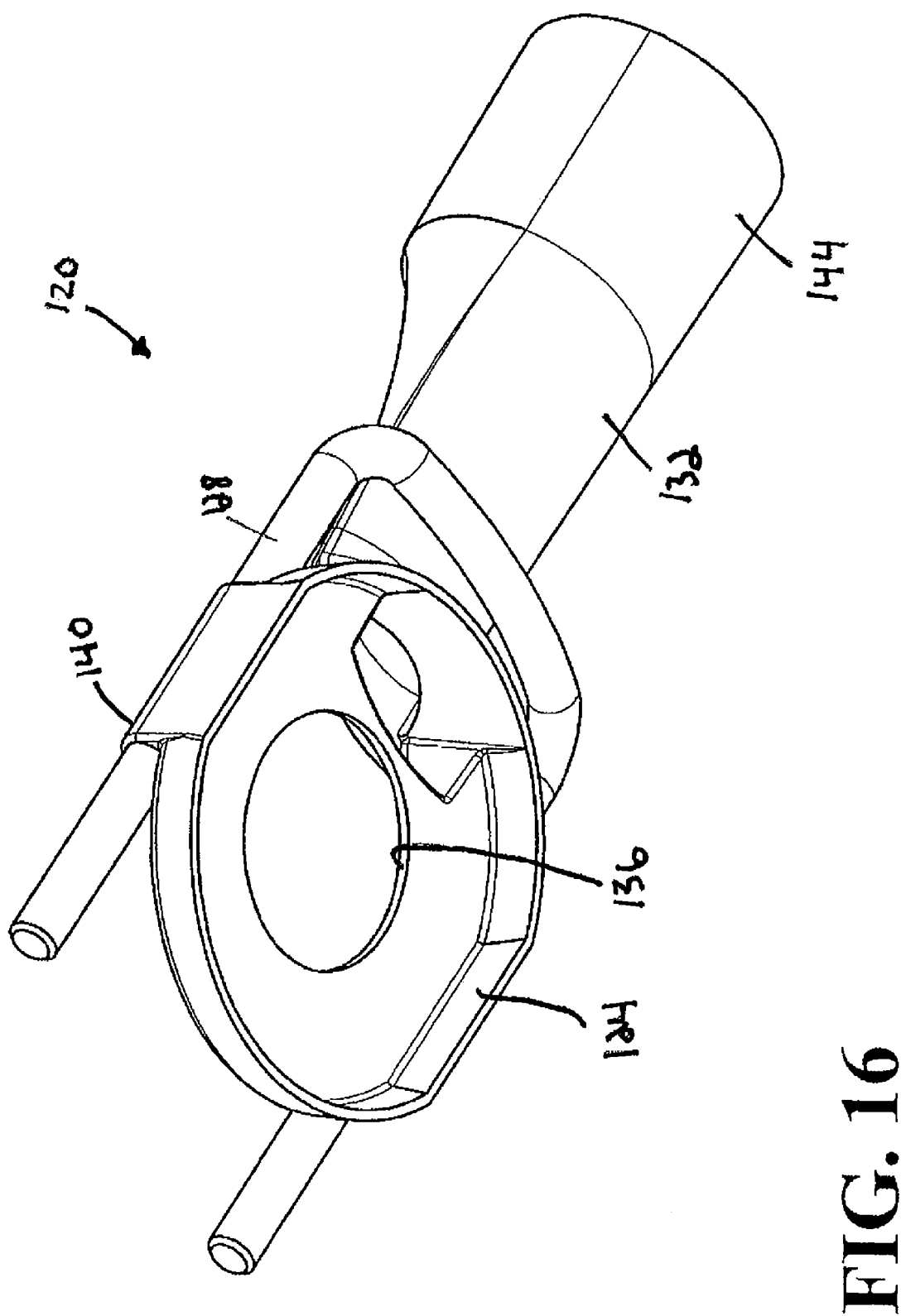
FIG. 16 is a bottom perspective of the dust chute illustrated in FIG. 13.
Figure 17:
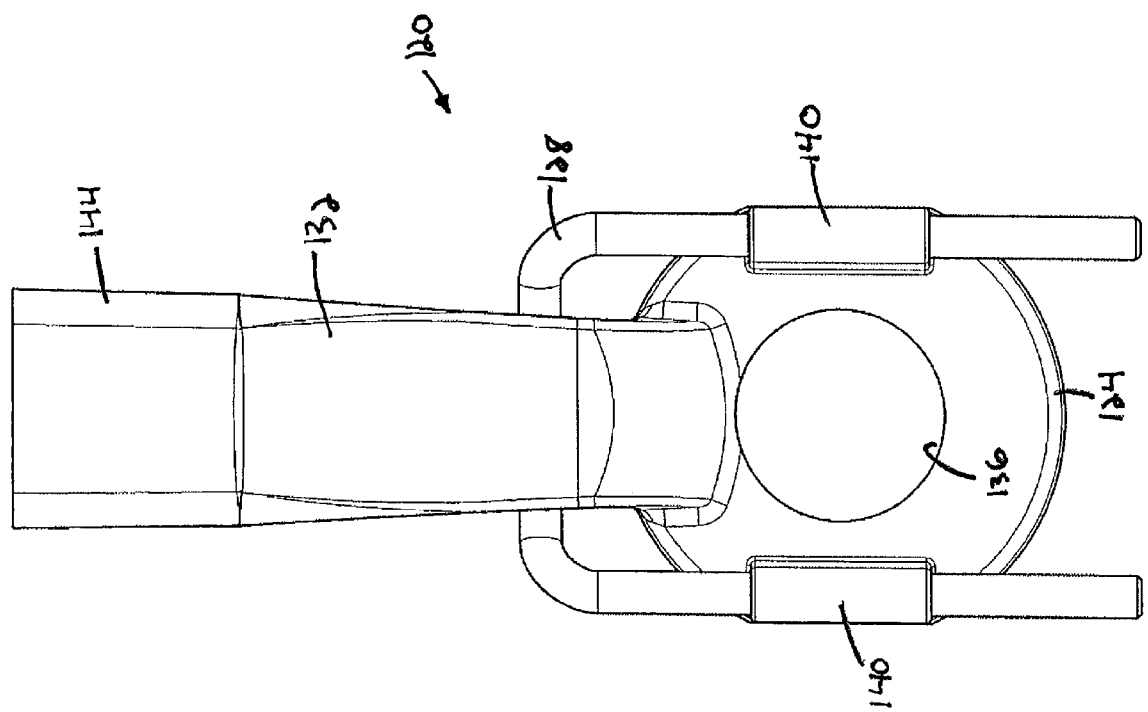
FIG. 17 is a top view of the dust chute illustrated in FIG. 13.
Figure 18:
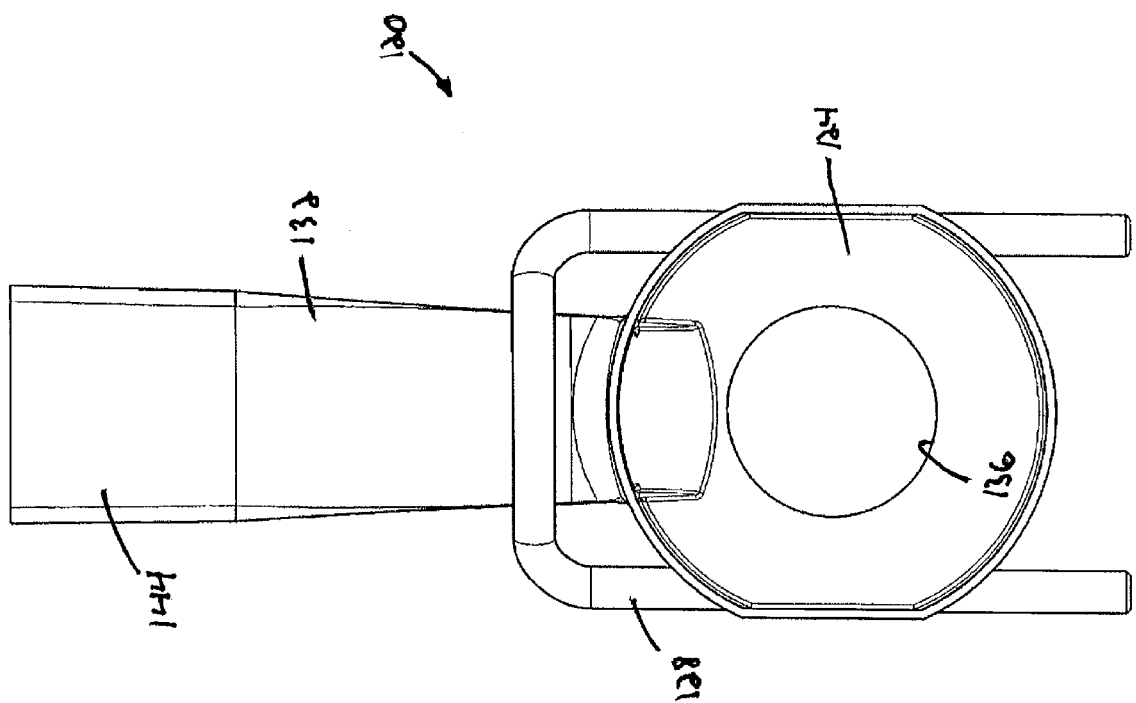
FIG. 18 is a bottom view of the dust chute illustrated in FIG. 13.
Figure 19:
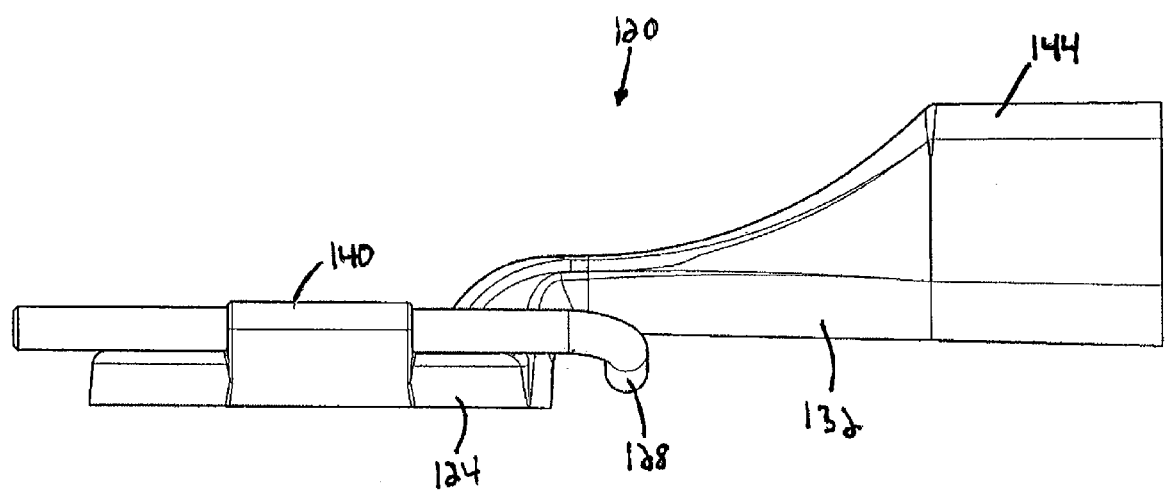
FIG. 19 is a right side view of the dust chute illustrated in FIG. 13.
Figure 20:
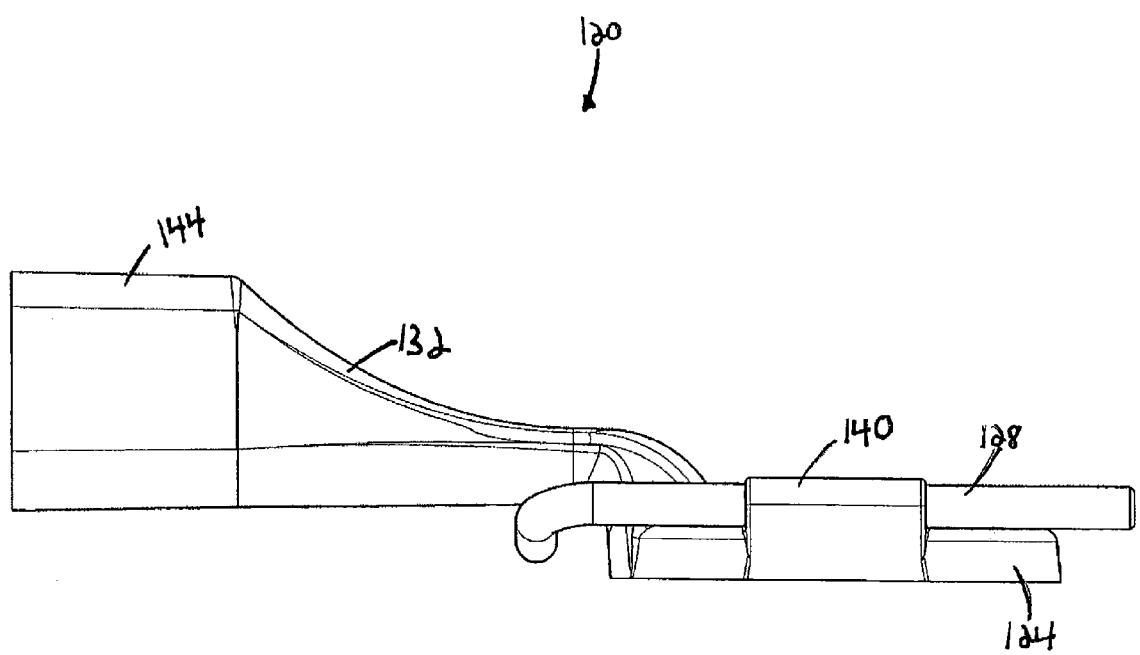
FIG. 20 is a left side view of the dust chute illustrated in FIG. 13.
Figure 21:
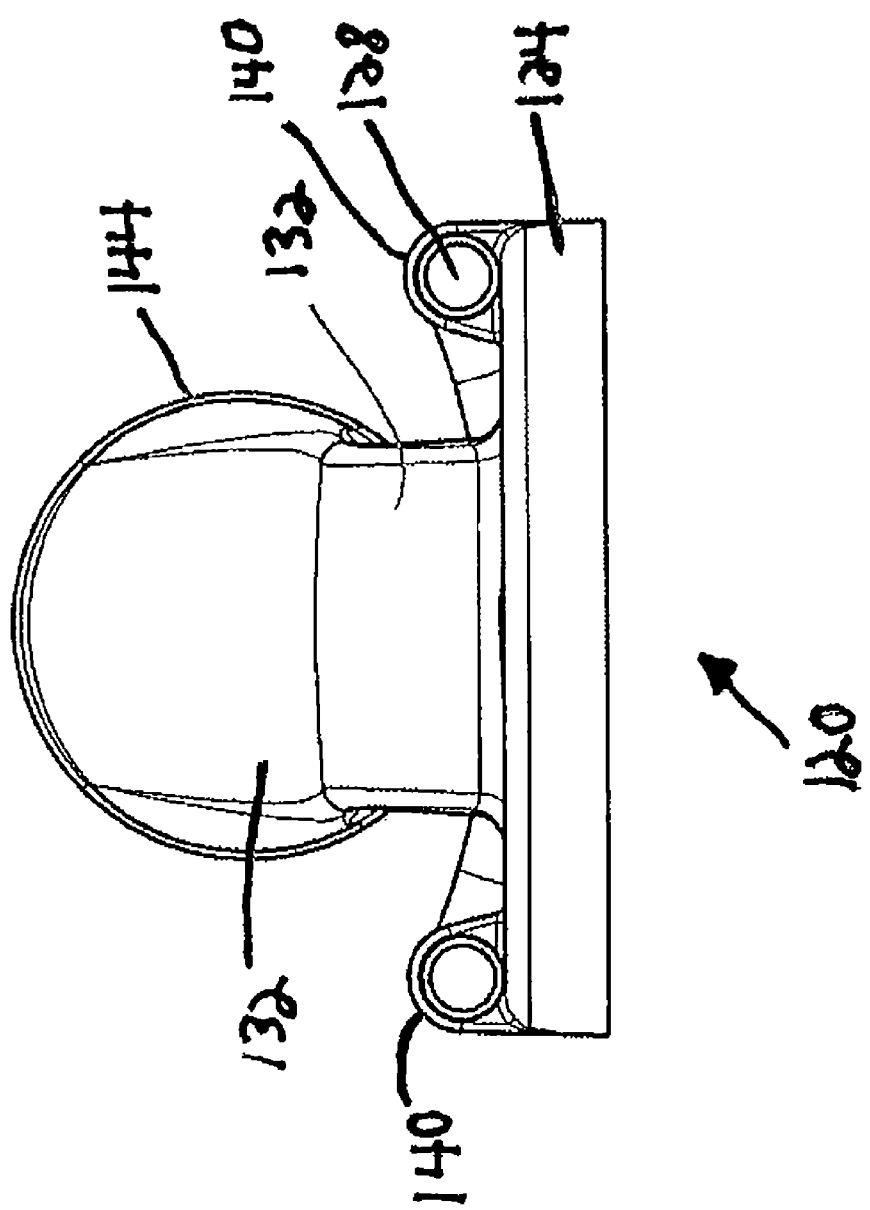
FIG. 21 is a front view of the dust chute illustrated in FIG. 13.
Figure 22:
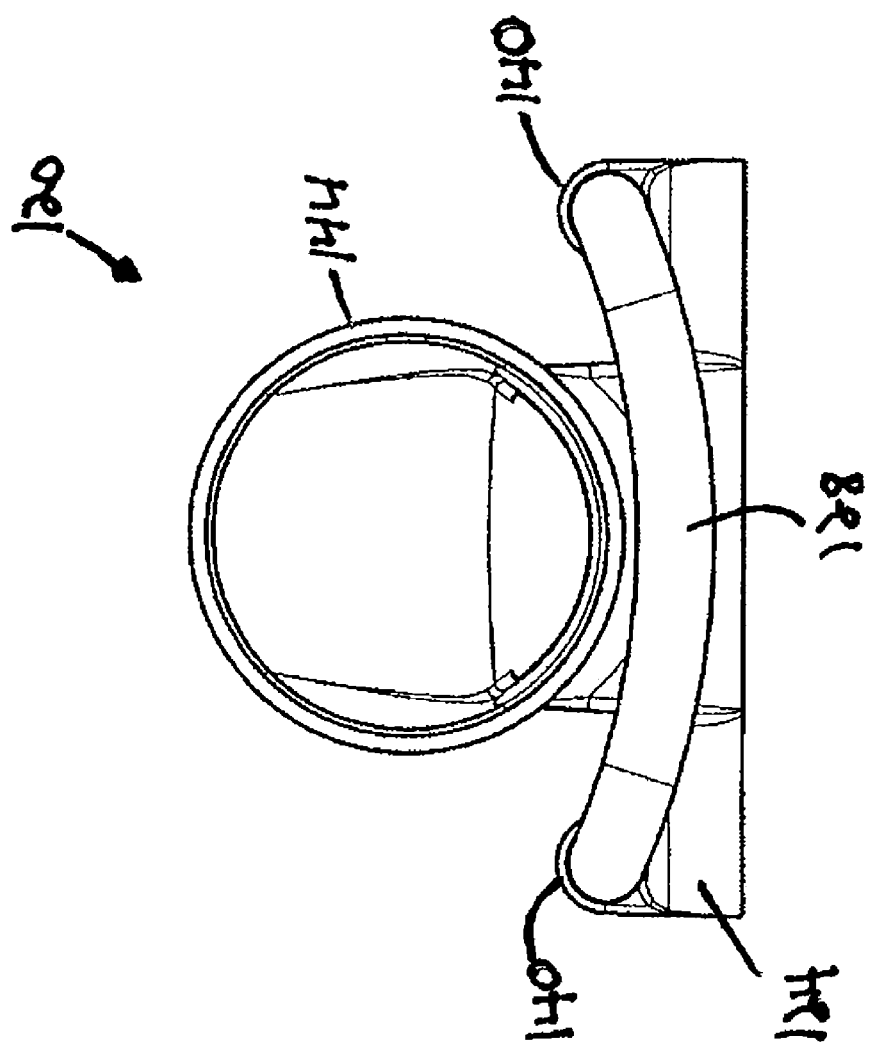
FIG. 22 is a rear view of the dust chute illustrated in FIG. 13.

With particular reference to FIGS. 13 and 14, connection of the dust chute 120 to the router 20 will be described. The lower base portion 80 of the router 20 includes a pair of channels or connectors 148 for typically receiving and supporting fasteners or connection rods 152 of an edge guide 156 (see FIGS. 23 and 24). The dust chute 120 is connected to the lower base portion 80 using the same channels 148 used to connect the edge guide 156 to the router 20. The connection rod 128 is removed from the connectors 140 and the body 124 of the dust chute 120 is positioned in the recess 104 of the lower base portion 80 (as shown in FIGS. 13 and 14) such that the connectors 140 align with the channels 148 of the lower base portion 80. The ends of the connection rod 128 are then inserted into and through respective channels 148, and into and through respective connectors 140 of the dust chute 120. With the connection rod 128 in place, the dust chute 120 is connected to the lower base portion 80 of the router 20. The dust chute 120 is removable by reversing the connection steps described above.

Figure 23:
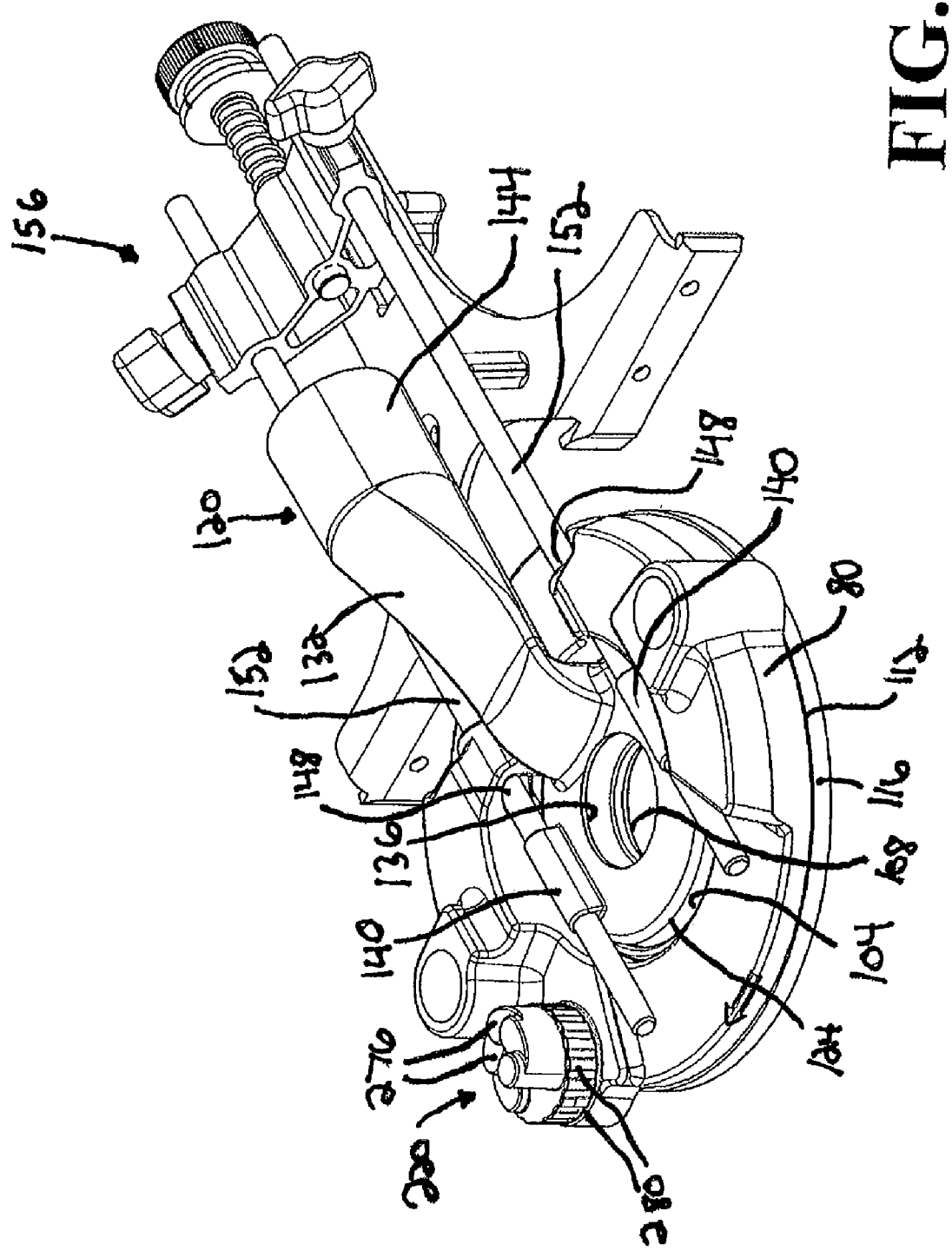
FIG. 23 is a top perspective view of the dust chute connected to a portion of the router base with an edge guide.
Figure 24:
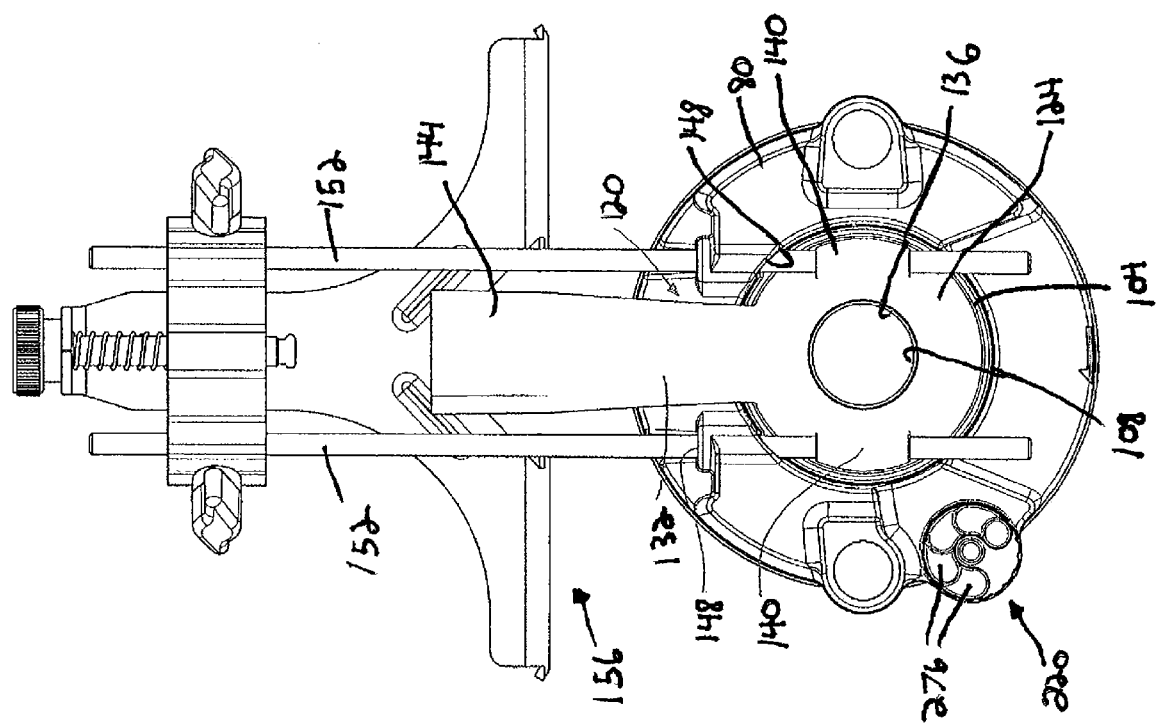
FIG. 24 is a top view of the dust chute connected to a portion of the router base with the edge guide illustrated in FIG. 23.
Figure 25:
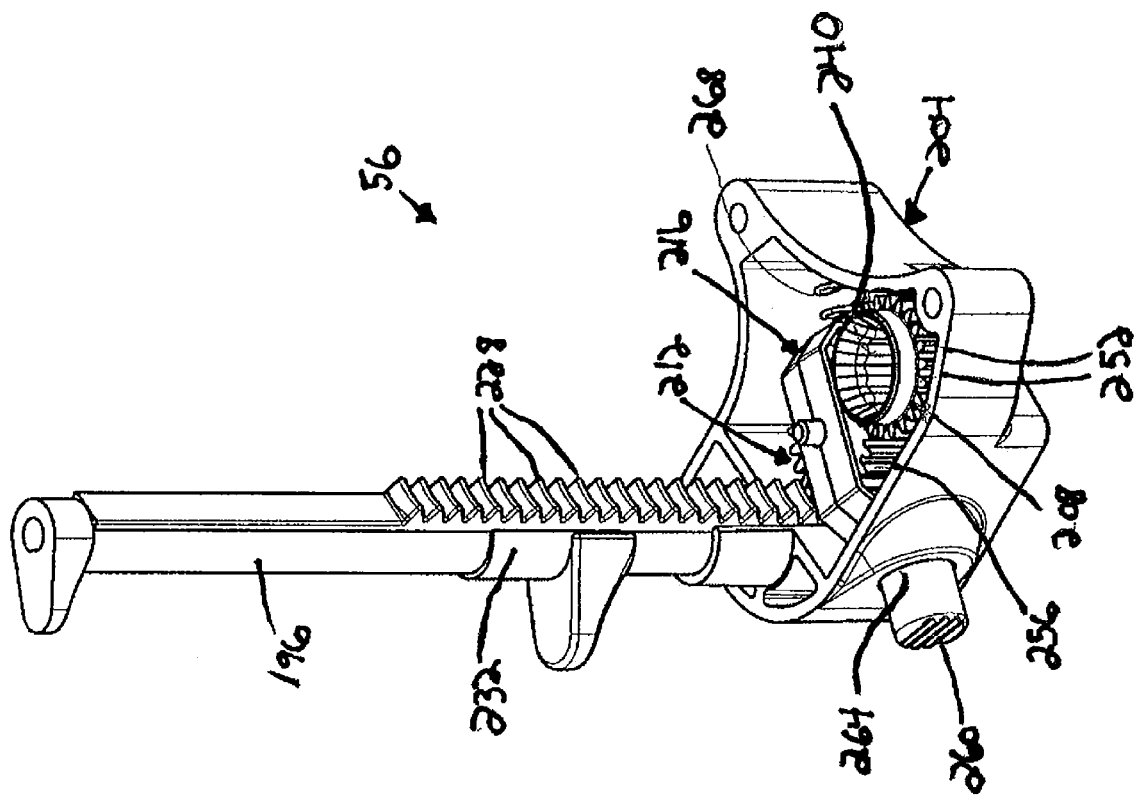
FIG. 25 is a top perspective view of at least a portion of a depth adjustment mechanism of the router illustrated in FIG. 1, the depth adjustment mechanism shown in an engaged condition.
Figure 26:
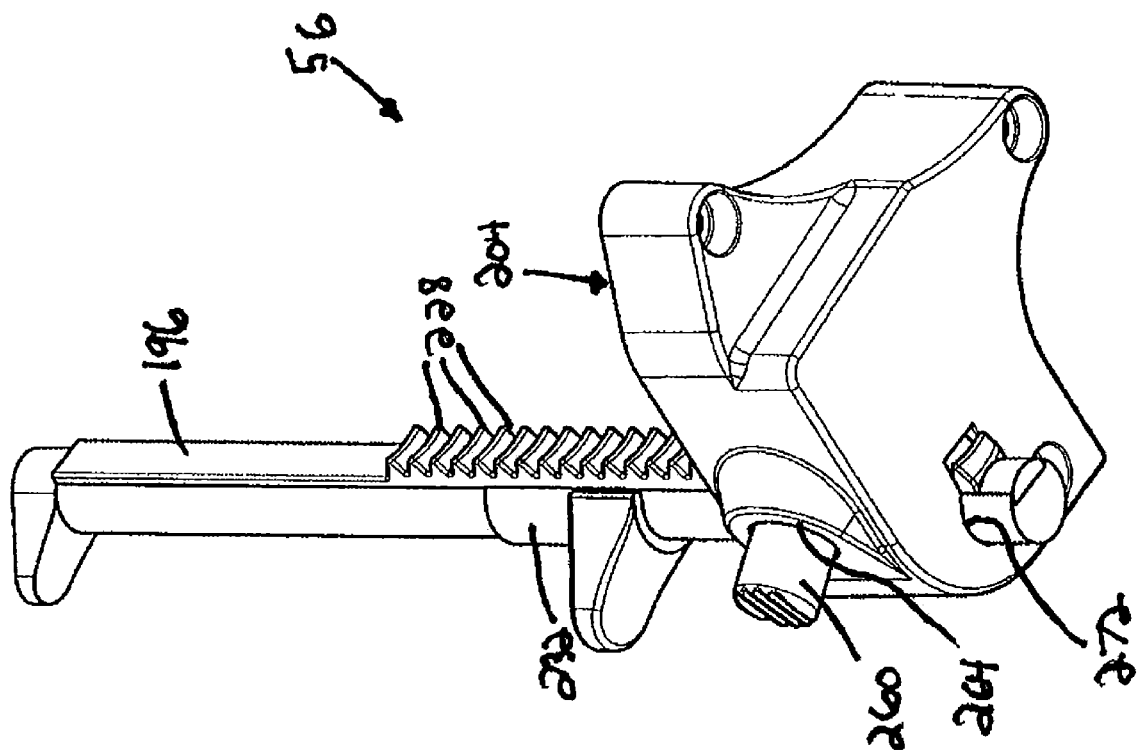
FIG. 26 is a bottom perspective view of the depth adjustment mechanism illustrated in FIG. 25.
Figure 27:
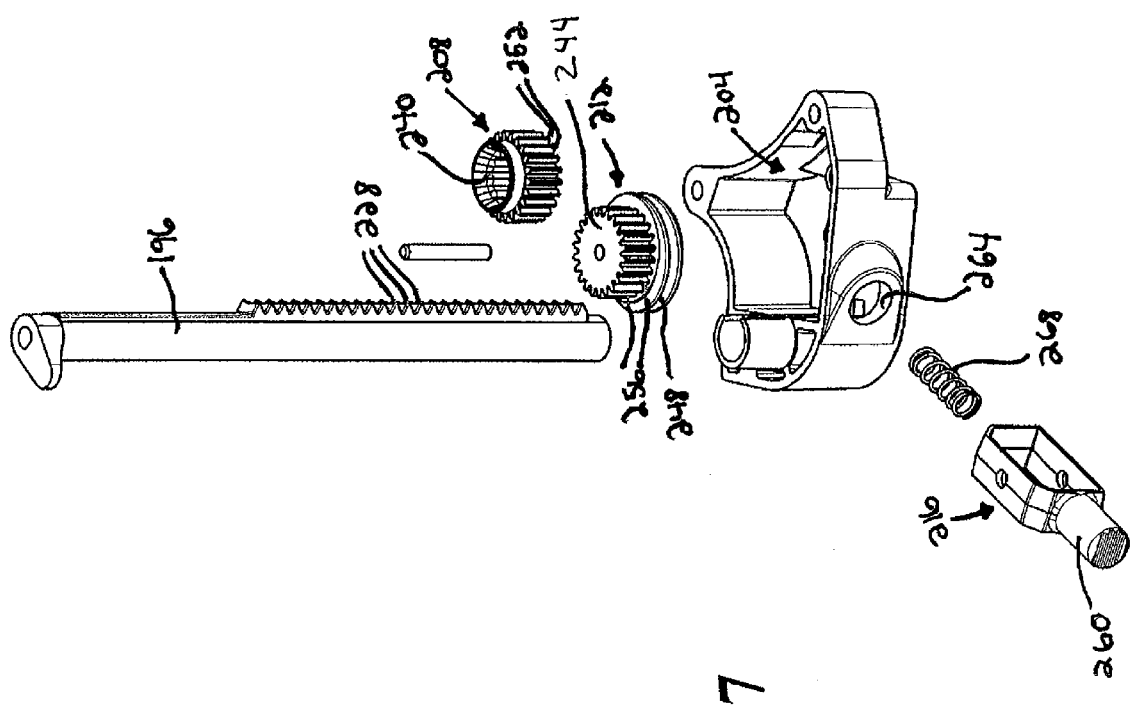
FIG. 27 is an exploded view of the depth adjustment mechanism illustrated in FIG. 25.
Figure 28:
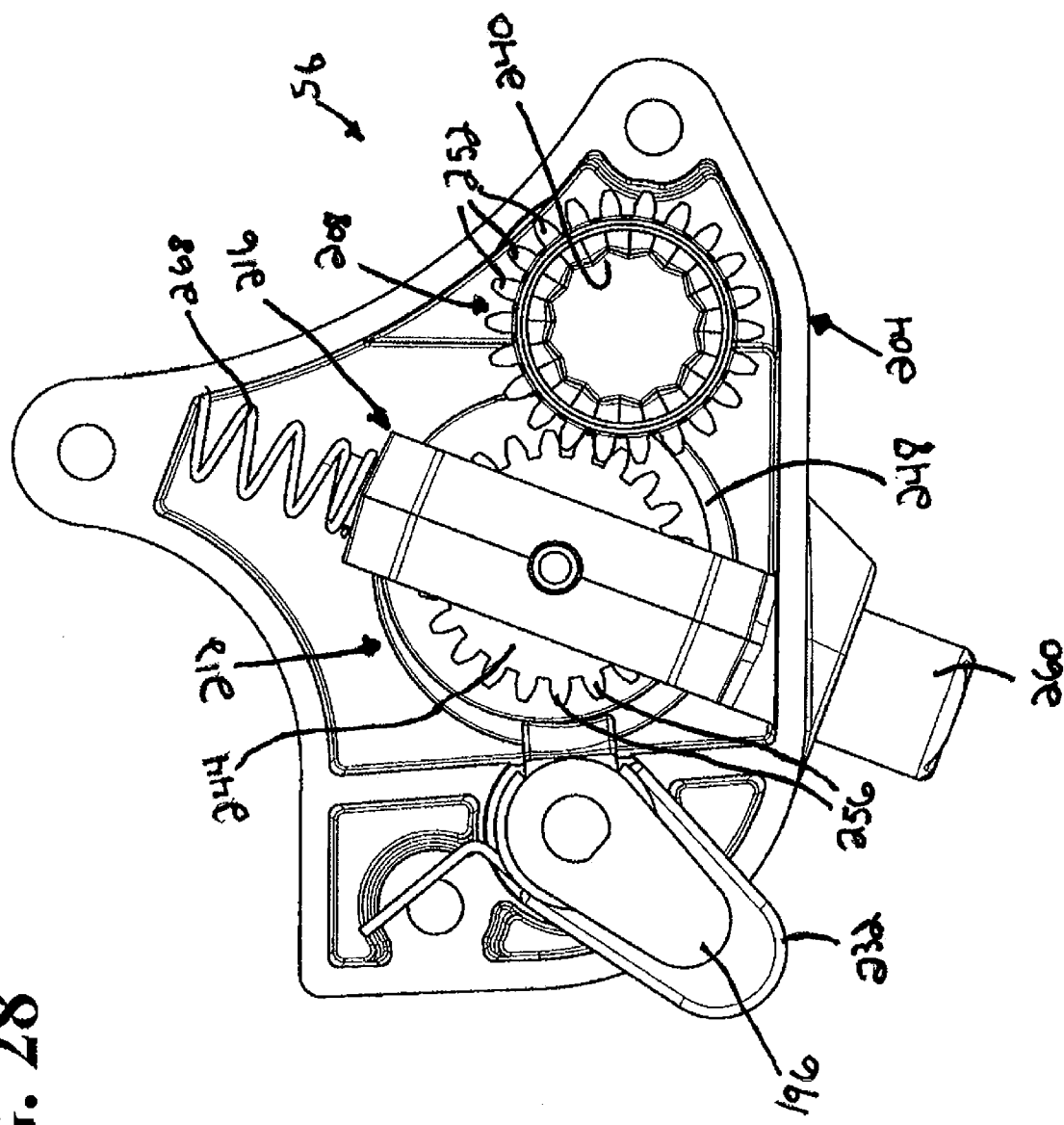
FIG. 28 is a top view of the depth adjustment mechanism illustrated in FIG. 25.
Figure 29:
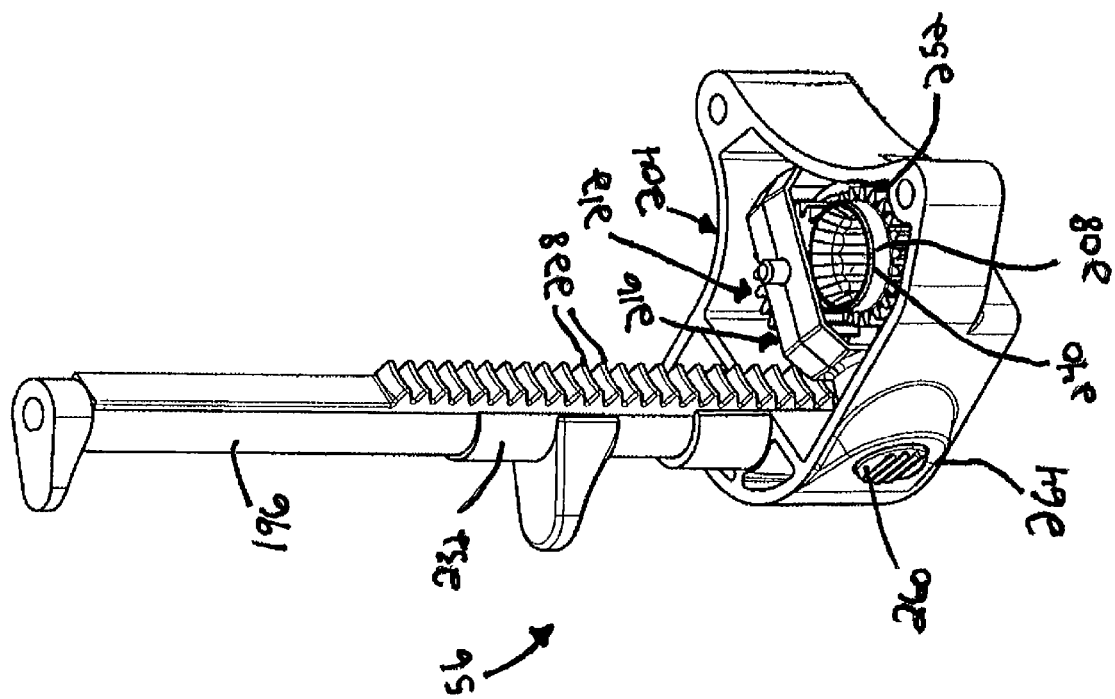
FIG. 29 is a top perspective view of the depth adjustment mechanism of the router illustrated in FIG. 1, the depth adjustment mechanism shown in a disengaged condition.
Figure 30:
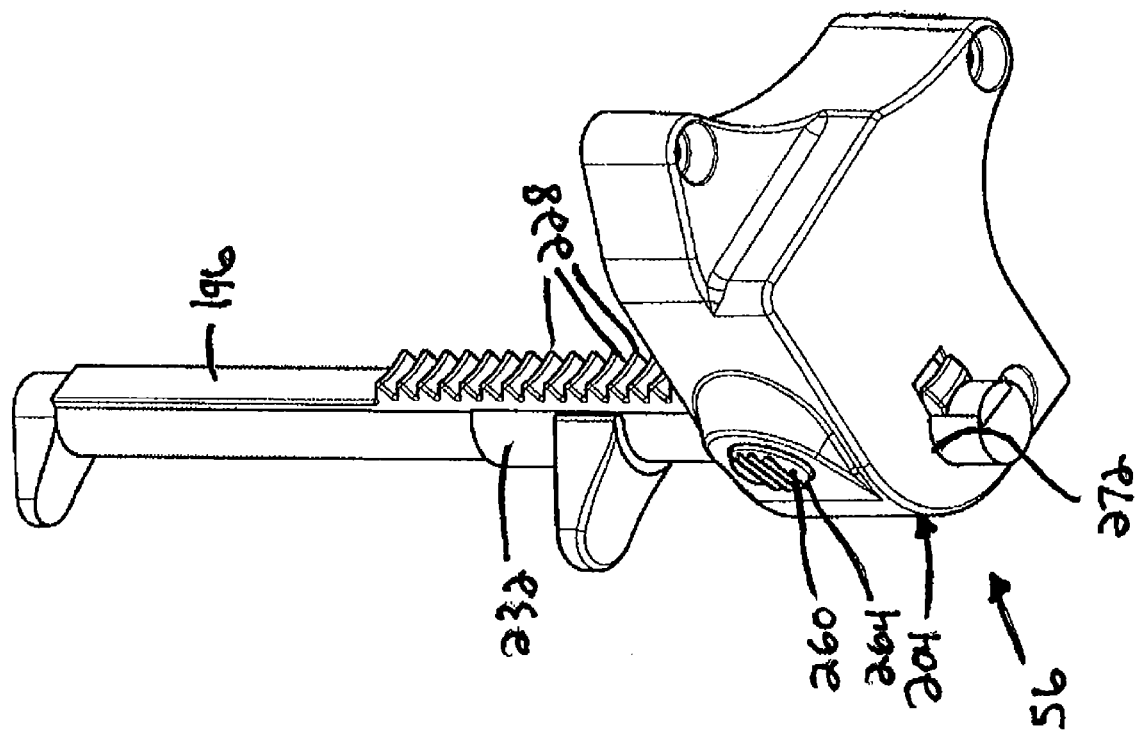
FIG. 30 is a bottom perspective view of the depth adjustment mechanism illustrated in FIG. 29.
Figure 31:
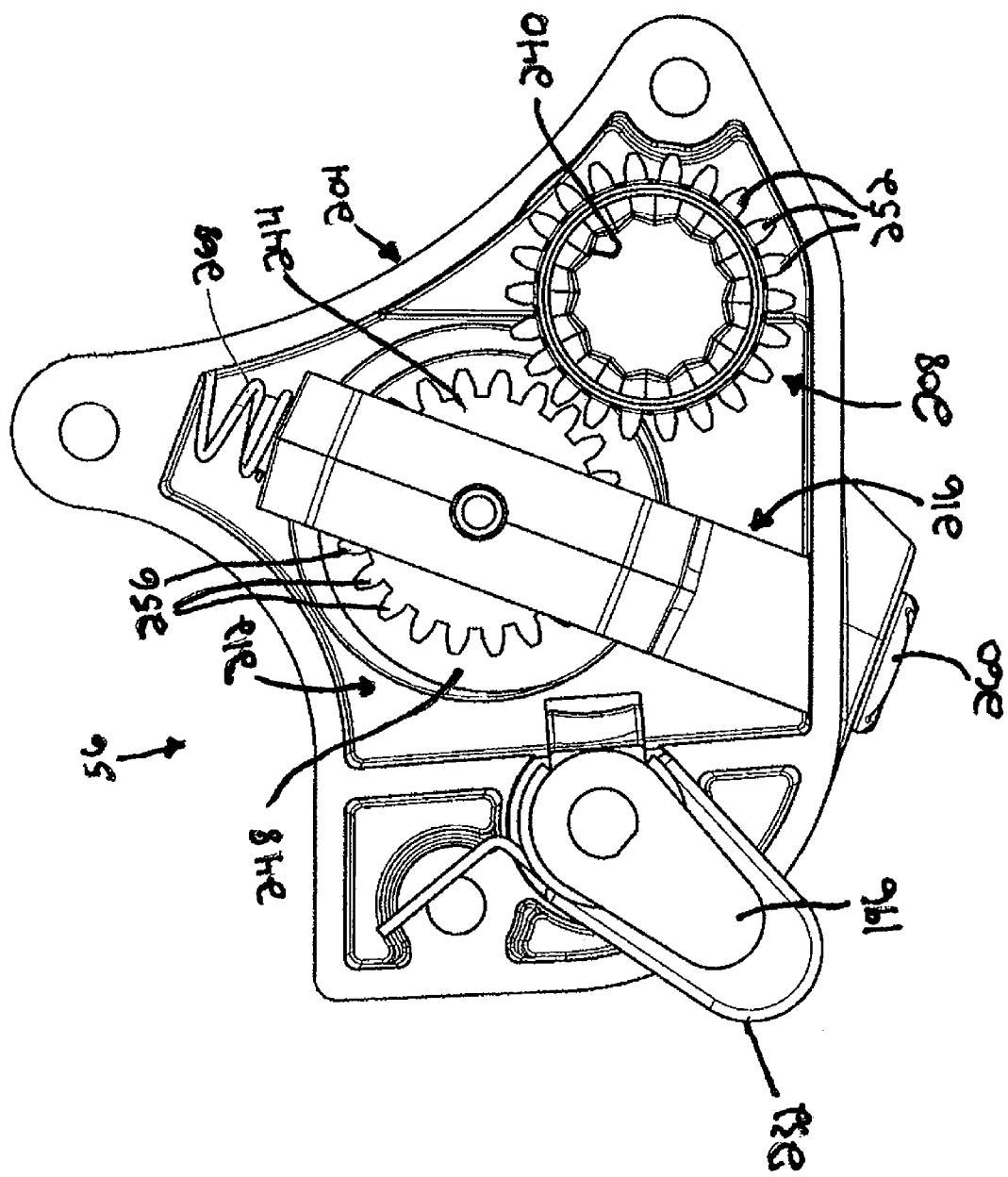
FIG. 31 is a top view of the depth adjustment mechanism illustrated in FIG. 29.

With particular reference to FIGS. 23 and 24, the dust chute 120 is connectable to the lower base portion 80 in another manner. The dust chute 120 is connectable to the lower base portion 80 by using the connection rods 152 of an edge guide 156. Connection of the dust chute 120 to the lower base portion 80 in this manner does not require the use of the dust chute connection rod 128. The body 124 of the dust chute 120 is positioned in the recess 104 of the lower base portion 80 such that the connectors 140 are aligned with the channels 148 of the lower base portion 80. Then, the connection rods 152 of the edge guide 156 are inserted into and through respective channels 148, and into and through respective connectors 140 of the dust chute 120. With the connection rods 152 in place, both the dust chute 120 and the edge guide 156 are connected to the lower base portion 80 of the router 20. The dust chute 120 and edge guide 156 are removable by reversing the connection steps described above.

In some constructions, the plunge base 24 can include a plunge lock mechanism 160 to secure the base support component 84 in a vertical position along the guide posts 88 relative to the lower base portion 80. The plunge lock mechanism 160 includes an operating member 164 and a locking implement 168 coupled at one end to the operating member 164. The operating member 164 can be positioned adjacent one of the handles 172, such that a user can operate the plunge lock mechanism 160 with a thumb while gripping the adjacent handle 172 with the same hand. The locking implement 168 can be adapted to extend generally horizontally from the operating member 164 toward one of the guide posts 88 through an aperture in the base support component 84. In some constructions, the operating member 164 can be coupled to a first end of the locking implement 168 such that moving the operating member 164 from a locked position to an unlocked position rotates the locking implement 168, thereby moving the second end of the locking implement 168 further away from the guide post 88. Similarly, moving the operating member 164 from an unlocked position to a locked position can rotate the locking implement 168 in the opposite direction, thereby moving the second end of the locking implement 168 toward the guide post 88.

In some constructions, the plunge lock mechanism 160 can have two operating positions, a locked position and an unlocked position. In the locked position, the locking implement 168 can engage the outer surface of the guide post 88 and restrict the vertical movement of the base support component 84 relative to the lower base portion 80. In the unlocked position, the locking implement 168 can be positioned so that it does not engage the outer surface of the guide post 88, and the base support component 84 can move vertically along the guide posts 88 relative to the lower base portion 80. The plunge lock mechanism 160 can be biased to the locked position by a spring element 176 or other biasing member.

In some constructions, the plunge lock mechanism can include means for holding the plunge lock mechanism 160 in the unlocked position, such as a latch or other device.

In some constructions, the locking implement can include multiple pieces. In one construction, for example, the locking implement can include an engagement piece threaded inside the main body of the locking implement. The engagement piece can be adapted to engage the guide post when the plunge lock mechanism is in the locked position. In addition, fine adjustment of the locking pressure of the plunge lock mechanism can be performed by varying the position of the engagement piece relative to the main body of the locking implement.

As shown in FIGS. 1-12, ergonomic handles 172 are coupled to opposite sides of the base support component 84. In other constructions, the handles 172 can be coupled to the router 20 at other locations. As shown herein, the handles 172 are fixed relative to the base support component 84. In other constructions, the handles 172 can be adapted to pivot relative to the base support component 84. In some constructions, the handles 172 include soft-grip material covering at least a portion of the handles 172 to provide extra friction for gripping.

As shown in FIGS. 2-12, the base support component 84 includes a central aperture 180 for receiving the lower housing portion 48 of the motor housing assembly 28. The central aperture 180 is defined by a cylindrical wall including a movable tab 182. The tab 182 is movable between an inner engaging position, in which the tab 182 is biased inward to engage an outer surface of the lower housing portion 48 of the motor housing assembly 28, and an outer disengaging position, in which the tab 182 is outward away from the outer surface of the lower housing portion 48. The base support component 84 includes a clamping mechanism 188 to move the tab 182 between the engaging and disengaging positions. Moving the clamping mechanism 188 toward the base support component 84 moves the tab 182 into the engaging position and inhibits movement of the motor housing assembly 28 relative to the base support component 84, while moving the clamping mechanism 188 away from the base support component 84 moves the tab 182 to the disengaging position and allows the motor housing assembly 28 to move relative to the base support component 84. Alternatively, the base support component 84 can include a vertical seam 184. As a result, the inner diameter of the cylindrical wall may be increased or decreased by respectively opening or closing the seam 184. The clamping mechanism 188 of the base support component 84 is movable to control the opening and closing of the seam 184. Closing the seam using the clamping mechanism 188 causes the inner surface of the cylindrical wall to engage the outer surface of the lower housing portion 48 and to restrict the vertical movement of the motor housing assembly 28. Therefore, when the seam is generally closed, the base support component 84 is in a clamped position, in which the position of the motor housing assembly 28 relative to the base support component 84 is fixed. Opening the seam releases the motor housing assembly 28 and allows the motor housing assembly 28 to move vertically relative to the base support component 84. Referring to FIG. 2, the fixed base 32 operates in much the same manner as the plunge base 24 to connect and disconnect the motor housing assembly 28 to the fixed base 32. The construction and operation of the clamping mechanism 188 and related components may be similar to that shown and described in U.S. Pat. No. 6,725,892, issued Apr. 27, 2004; published U.S. Patent Application No. 2004/0035495, filed Aug. 20, 2003; and published U.S. Patent Application No. 2007/0095429, filed Dec. 5, 2006; the entire contents of which are hereby incorporated by reference.

As shown in FIGS. 2, 3, 10, and 13, the base support component 84 includes a depth adjustment channel 192 that is positioned adjacent the central aperture 180 and is generally vertically oriented. The depth adjustment channel 192 is generally hollow and is open at its top and bottom ends. To properly connect the motor housing assembly 28 to the plunge base 24, the depth adjustment shaft 52 is coaxially aligned with the depth adjustment channel 192, the lower housing portion 48 is coaxially aligned with the central aperture 180 of the base support component 84, and the depth adjustment shaft 52 and the lower housing portion 48 are moved linearly, vertically downward (i.e., dropped straight downward) such that the depth adjustment shaft 52 inserts into the depth adjustment channel 192 and the lower housing portion 48 inserts into the central aperture 180. Insertion of the motor housing assembly 28 is complete when the upper housing portion 44 rest on top of the base support component 84. The clamping mechanism 188 is then actuated to close the seam 184 and secure the motor housing assembly 28 to the plunge base 24. With reference to FIG. 2, the motor hosing assembly 28 is similarly connectable to the fixed base 32 by inserting the depth adjustment shaft 52 into the depth adjustment channel 192 of the fixed base 32 and lower housing portion 48 into the central aperture 180 of the fixed base 32 along a vertically linear path. In this manner, the depth adjustment shaft 52, the depth adjustment knob 68, and the position indication ring 76 are useable with both the plunge base 24 and the fixed base 32 to adjust the height of the tool element relative to a workpiece. Adjustment of the plunge base 24 and the fixed base 32 may be achieved on the same scale or a different scale. For example, if adjusted on a different scale, the fixed base may be adjusted on a five threads per inch scale, while the plunge base may be adjusted on an eight-threads per inch scale. Since the threads 64 on the depth adjustment shaft 52 are a constant in height adjustment operation of both the plunge base 24 and the fixed base 32, the components of the plunge base 24 and fixed base 32 engaging the threads 64 of the shaft 52 are different to enable the exemplary eight threads per inch and the five threads per inch, respectively. Also, for example, if adjustment of the plunge base 24 and the fixed base 32 occurs on the same scale, then the components of the plunge base 24 and the fixed base 32 engaging the threads 64 of the shaft 52 are similar to enable the similar adjustment such as, for example, both the plunge base 24 and the fixed base 32 being adjusted at five threads per inch or eight threads per inch.

With reference to FIG. 1, the motor housing assembly 28 and the base support component 84 are vertically movable together along the guide posts 88 relative to the lower base portion 80 when the motor housing assembly 28 is supported by and connected to the plunge base 24. The router 20 as described above and illustrated in FIGS. 1 and 3-12 is operable to cut a workpiece. The router 20 is positionable on a workpiece such that the bottom surface of either the lower base portion 80 or a sub-base 116 contacts the workpiece. To plunge the router 20 (i.e., to move the motor housing assembly 28 and the base support component 84 vertically downward toward the workpiece), a user grasps the handles 172, or another part of the router 20 movable relative to the lower base portion 80, moves the plunge lock mechanism 160 to the unlocked position, and moves the tool element downward toward the workpiece by moving the base support component 84 and motor housing assembly 28 downward along the guide posts 88. In this manner, the tool element can be moved vertically into and out of contact with the workpiece. When the tool element is positioned at a desired depth, the plunge lock mechanism 160 is moved to the locked position to maintain the vertical position of the tool element. During operation of the router 20, the vertical movement of the motor housing assembly 28 relative to the base support component 84 should be restricted by having the clamping mechanism 188 in the clamped position to close the seam 184.

Referring now to FIGS. 2-12 and 25-31, the router 20 includes a depth adjustment mechanism 56 having the depth adjustment shaft 52, a depth stop rod 196, a stop rod locking pin 200, a depth adjustment receptacle 204, first and second gear elements 208, 212, a bracket 216, and a depth stop 220.

With continued reference to FIGS. 2-12 and 25-31, the base support component 84 includes a generally vertical stop rod channel 224 extending completely through a section of the base support component 84. The depth stop rod 196 is positioned within the stop rod channel 224 so that the depth stop rod 196 extends through the stop rod channel 224 with portions of the depth stop rod 196 projecting above and below the stop rod channel 224. The depth stop rod 196 has a plurality of projections or teeth 228 on a side thereof. The stop rod channel 224 has a shape substantially complementary to the cross-sectional shape of the depth stop rod 196. These complementary shapes allow the depth stop rod 196 to move vertically within the stop rod channel 224, but prevents rotational movement of the depth stop rod 196 relative to the stop rod channel 224. In addition, a depth indicator 232 is coupled to the depth stop rod 196 and is adapted to cooperate with a scale 236 to facilitate accurate vertical positioning of the depth stop rod 196. The depth indicator is movable along the rod by a user. Further, as shown in FIGS. 3, 6, and 9-13, the stop rod locking pin 200 is supported by the base support component 84 such that a portion of the locking pin 200 is positioned within an aperture that extends from a side surface of the base support component 84 inward to the stop rod channel 224. The stop rod locking pin 200 is adapted to be generally horizontally movable relative to the base support component 84 and is engageable with the depth stop rod 196 to restrict the movement of the depth stop rod 196 relative to the base support component 84. In the illustrated construction, the depth stop locking pin 200 is threaded and is rotatable to engage and disengage the depth stop rod 196.

With continued reference to FIGS. 2-12 and 25-31, the depth adjustment receptacle 204 is coupled to a bottom-facing surface of the base support component 84. The first gear element 208 and the second gear element 212 are supported within the depth adjustment receptacle 204 for rotation about substantially vertical and parallel axes. When the motor housing assembly 28 is connected to the plunge base 24, the lower end 72 of the depth adjustment shaft 52 is positioned in and engages an inner surface 240 of the first gear element 208 to rotatably connect the depth adjustment shaft 52 and the first gear element 208. The inner surface 240 of the first gear element 208 is shaped to receive the lower end 72 of the depth adjustment shaft 52 in a variety of orientations and prevent rotation of the depth adjustment shaft 52 relative to the first gear element 208. In other words, the lower end 72 of the depth adjustment shaft 52 and the first gear element 208 engage to ensure that the depth adjustment shaft 52 and the first gear element 208 rotate together. The second gear element 212 is disposed adjacent to the first gear element 208 and includes an upper gear portion 244 and a lower threaded portion 248. The outer surface of the first gear element 208 includes gear teeth 252 and is adapted to engage gear teeth 256 of the upper gear portion 244 of the second gear element 212. The lower threaded portion 248 of the second gear element 212 is adapted to engage the teeth 228 on the depth stop rod 196.

The second gear element 212 is supported for rotation within the depth adjustment receptacle 204 by the bracket 216, which includes a course adjustment actuator 260 projecting from the bracket 216. The coarse adjustment actuator 260 extends through an aperture 264 defined in a side wall of the receptacle 204. The bracket 216 is supported by and movable relative to the depth adjustment receptacle 204 between an engaged condition (see FIGS. 25, 26, and 28), in which the actuator 260 is not depressed and the second gear element 212 engages the depth stop rod 196, and a disengaged condition (see FIGS. 29-31), in which the actuator 260 is depressed and the second gear element 212 is out of contact with the depth stop rod 196. A biasing member or spring 268 is disposed between the bracket 216 and a side wall of the receptacle 204 to bias the bracket 216 toward the engaged condition.

Referring now to FIGS. 25-31, the depth adjustment receptacle 204 further includes an aperture 272 through its bottom surface such that the depth stop rod 196 can extend through the aperture 272 and out the bottom of the receptacle 204. The aperture 272 is shaped substantially complementarily to the cross-sectional shape of the depth stop rod 196. Such complementary shapes allow the depth stop rod 196 to move vertically, but prevents rotational movement between the depth stop rod 196 and the depth adjustment receptacle 204.

As shown in FIGS. 2-9, 13, and 14, the depth stop 220 is coupled to the lower base portion 80 of the plunge base 24. The depth stop 220 is rotatable relative to the lower base portion 80 and includes a plurality of step surfaces 276 positioned at different heights relative to a bottom surface of the lower base portion 80. As shown, the vertical distance between immediately adjacent step surfaces 276 is constant throughout each step surface 276. Alternatively, vertical distances between adjacent steps 276 can be different (or inconsistent) relative to one another and can be any desired value. The depth stop 220 includes external ribs 280 to facilitate gripping by a user. The depth stop 220 is rotatable between a plurality of positions complementary to the number of step surfaces 276 and positively locks in each of the plurality of positions to ensure proper positioning of the depth stop 220.

In alternative constructions, the depth stop can include three staircase structures, each including four step surfaces. The depth stop can also include a cap having a generally flat top surface and an ergonomic side surface. The ergonomic side surface includes longitudinal grooves to facilitate gripping by a user. The cap is rotatable and includes protrusions adapted to support the cap on the step surfaces. The cap is biased downward, toward the floor surface, by a spring element or other biasing member. The vertical height of the top surface of the cap is adjustable and can be selected by positioning the cap such that it is supported by step surfaces having a desired height. The height of the top surface can be increased incrementally by lifting the cap against the biasing force, rotating the cap in a clockwise direction until the protrusions are positioned above the next adjacent step surfaces, and then allowing the spring element or other biasing member to bring the protrusions into contact with these step surfaces. Similarly, the height of the top surface can be decreased incrementally by rotating the cap in a counterclockwise direction until the protrusions are positioned above the next adjacent step surfaces and then allowing the spring element or other biasing member to bring the protrusions into contact with these step surfaces. The cap includes three protrusions adapted to support the cap on the step surfaces, with each protrusion being adapted to engage one of the staircase structures. In other constructions, any number of staircase structures having any number of step surfaces can be used. In some constructions, for example, one continuous staircase structure could be used. In addition, immediately adjacent step surfaces can be vertically separated by any distance, and the vertical distance between immediately adjacent step surfaces does not need to be constant throughout the staircase structures. In some constructions, the staircase structures can be molded or machined as part of the lower base portion 80.

In some constructions, the depth stop 220 can be imprinted or otherwise marked with position-indicating markings. In still other constructions, the top surface of the lower base portion 80 can be imprinted or otherwise marked with position-indicating markings such that the markings are positioned adjacent the depth stop 220. In still other constructions, both the depth stop 220 and the top surface of the lower base portion 80 can be imprinted or otherwise marked with position-indicating markings.

In addition, in other constructions, other configurations and types of depth stops can be used instead of the depth stop illustrated herein. For example, in some constructions, a rotatable depth stop turret, such as the turrets illustrated and described in U.S. Pat. Nos. 5,191,921 and 6,568,887, can be used.

In operation, the depth adjustment mechanism 56 can be used to control the maximum depth of cut of the router 20. The depth stop 220 is rotated to the desired location to position the desired step 276 in alignment with the depth stop rod 196 such that the depth stop rod 196 can contact the step 276 to limit downward movement of the tool element during plunging of the router 20. The maximum depth of cut can be determined by adjusting the depth stop 220 to position a desired one of the steps 276 in alignment with the depth stop rod 196.

The vertical position of the depth stop rod 196 can be adjusted in two manners: fine and course. For fine adjustment, the motor housing assembly 28 is supported by the plunge base 24 such that the lower end 72 of the depth adjustment shaft 52 engages the inner surface 240 of the first gear element 208 to rotatably connect the depth adjustment shaft 52 and the first gear element 208. The stop rod locking pin 200 is positioned such that it does not engage the depth stop rod 196. The adjustment knob 68 is rotated in either direction, depending upon whether it is desired to increase or decrease the maximum depth of cut. When the adjustment knob 68 is rotated, the first gear element 208 rotates in the same direction and causes the second gear element 212 to rotate in the opposite direction. For example, if the first gear element 208 is rotated in a clockwise direction, the second gear element 212 will rotate in a counterclockwise direction. Rotation of the second gear element 212 causes the depth stop rod 196 to move vertically. Rotating the depth adjustment knob 68 in a first direction causes the depth stop rod 196 to move vertically upward, and rotating the depth adjustment knob 68 in a second direction causes the depth stop rod 196 to move vertically downward. Thus, by rotating the depth adjustment knob 68, the depth stop rod 196 can be vertically positioned as desired. Once the depth stop rod 196 is positioned as desired, the stop rod locking pin 200 is positioned to engage the depth stop rod 196 and restrict movement of the depth stop rod 196 relative to the base support component 84.

For course adjustment, the stop rod locking pin 200 is positioned such that it does not engage the depth stop rod 196. The course adjustment actuator 260 is moved from the engaged condition to the disengaged condition such that the second gear element 212 does not engage the depth stop rod 196. The depth stop rod 196 is then generally freely moveable to a desired vertical position. For example, a user can move the depth stop rod 196 to a desired position by hand. Once the depth stop rod 196 is positioned as desired, the course adjustment actuator 260 is released, thereby returning the actuator 260 to the engaged condition, and the stop rod locking pin 200 is positioned to engage the depth stop rod 196 and restrict movement of the depth stop rod 196 relative to the base support component 84.

Cutting depth of the fixed base router can be adjusted in both fine and course manners. These cutting depth adjustment manners are similar to that shown and described in U.S. Pat. No. 6,725,892, issued Apr. 27, 2004; U.S. Design Pat. No. D487,009, issued Feb. 24, 2004; published U.S. Patent Application No. 2004/0035495, filed Aug. 20, 2003; and published U.S. Patent Application No. 2007/0095429, filed Dec. 5, 2006; the entire contents of which are hereby incorporated by reference.

In some constructions, the router 20 can be supported in an inverted position below a support member, such as a table. In these constructions, the router 20 can include a connecting structure adapted to connect the depth adjustment mechanism 56 to the lower base portion 80 such that the cutting depth of the router 20 (the position of the tool element) can be adjusted from above the table. For example, the depth stop rod 196 can be adapted to be coupled to the lower base portion 80 such that the vertical position of the depth stop rod 196 is fixed relative to the lower base portion 80. Further, the router 20 can include an inverted adjustment member adapted to engage either the lower end of the depth adjustment shaft 52 or the first gear element 208 to rotatably connect the inverted adjustment member with the first gear element 208. The inverted adjustment member can be adapted to extend through an aperture in the support member such that it can be engaged above the support member by a user. The inverted adjustment member can be rotated, which causes the first and second gear elements 208, 212 to rotate. Because the depth stop rod 196 can be coupled to the lower base portion 80 and can be fixed, rotation of the second gear element 212 can move the base support component 84 and motor housing assembly 28 vertically along the teeth 228 of the depth stop rod 196.

The constructions described above and illustrated in the figures are presented by way of example only and are not intended as a limitation upon the concepts and principles of the present invention. It should be understood that a large variety of alternatives and variations exist to the embodiments discussed above and illustrated in the drawings. One of ordinary skill in the art will be able to recognize such alternatives and variations from the disclosure herein and, therefore, such alternatives and variations are within the spirit and scope of the present invention.

Various features of the invention are set forth in the following claims.

What is claimed is:

1. A kit comprising:
    a fixed router base;
    a plunge router base separate from the fixed router base;
    a motor assembly interchangeably supported by the fixed router base and the plunge router base, the motor assembly including a motor for driving a tool element and a motor housing supporting the motor; and
    a depth adjustment mechanism including a depth adjustment shaft at least partially supported by the motor assembly and a depth stop rod supported by the plunge router base;
    wherein the depth adjustment shaft cooperates with the fixed router base when the motor assembly is supported by the fixed router base to adjust a depth of cut of the tool element relative to the fixed router base, and wherein the depth adjustment shaft cooperates with the plunge router base when the motor assembly is supported by the plunge router base to adjust a position of the depth stop rod relative to the plunge router base in response to rotation of the depth adjustment shaft.

2. The kit of claim 1, wherein the fixed router base includes a first channel and the plunge router base includes a second channel, at least a portion of the depth adjustment mechanism being insertable into the first channel of the fixed router base when the motor assembly is supported by the fixed router base and being insertable into the second channel of the plunge router base when the motor assembly is supported by the plunge router base.

3. The kit of claim 1, wherein the depth adjustment mechanism further comprises an actuator, and wherein movement of the actuator when the motor assembly is supported by the fixed router base adjusts a depth of cut of the tool element relative to the fixed router base and wherein movement of the actuator when the motor assembly is supported by the plunge router base adjusts a depth of cut of the tool element relative to the plunge router base.

4. The kit of claim 1, wherein the motor assembly is insertable into and removable from the fixed router base and the plunge router base along a substantially linear path.

5. The kit of claim 1, wherein the motor assembly is insertable into and supported by the fixed router base and the plunge router base by moving the motor assembly substantially straight into the respective fixed router base and the plunge router base, and wherein the motor assembly is removable from the fixed router base and the plunge router base by pulling the motor assembly substantially straight out from the fixed router base and the plunge router base.

6. The kit of claim 1, wherein the depth adjustment mechanism includes an actuator coupled to the depth adjustment shaft and movable to finely adjust the depth stop rod relative to the plunge router base to finely adjust the depth of cut of the tool element.

7. The kit of claim 6, wherein the actuator is supported by the motor assembly.

8. The kit of claim 6, wherein the depth stop rod includes a plurality of teeth, wherein the depth adjustment shaft includes a first end coupled to the actuator and a second end, and wherein the depth adjustment mechanism further comprises
    a first gear having an inner surface engageable with the second end of the depth adjustment shaft, and an outer surface having a plurality of teeth;
    a second gear including a plurality of teeth engaging the teeth of the first gear, and at least one thread engaging at least a portion of the teeth of the depth stop rod;
    a bracket supporting the second gear, the bracket and the second gear being movable between a first position, in which the thread on the second gear engages the teeth of the depth stop rod, and a second position, in which the thread on the second gear does not engage the teeth of the depth stop rod; and
    a biasing member biasing the bracket and the second gear toward the first position.

9. The kit of claim 8, wherein the actuator is rotatable, wherein rotation of the actuator rotates the depth adjustment shaft, the first gear, and the second gear, which moves the depth stop rod relative to the plunge router base, when the bracket and the second gear are in the first position, and wherein rotation of the actuator does not move the depth stop rod relative to the plunge router base when the bracket and the second gear are in the second position.

10. A kit comprising:
    a first router base;
    a second router base separate from the first router base;
    a motor assembly interchangeably supported by the first router base and the second router base, the motor assembly including a motor for driving a tool element and a motor housing supporting the motor; and
    a depth adjustment mechanism at least partially supported by the motor assembly;
    wherein the depth adjustment mechanism cooperates with the first router base when the motor assembly is supported by the first router base to adjust a depth of cut of the tool element relative to the first router base and cooperates with the second router base when the motor assembly is supported by the second router base to adjust a depth of cut of the tool element relative to the second router base;
    wherein at least one of the first and second router bases is a plunge router base, wherein the depth adjustment mechanism includes
        a depth stop rod having a plurality of teeth;
        an actuator movable to finely adjust the depth stop rod relative to the plunge router base to finely adjust the depth of cut of the tool element;
        a depth adjustment shaft having a first end and a second end, the first end being coupled to the actuator;
        a first gear having an inner surface engageable with the second end of the depth adjustment shaft, and an outer surface having a plurality of teeth;
        a second gear including a plurality of teeth engaging the teeth of the first gear, and at least one thread engaging at least a portion of the teeth of the depth stop rod;

a bracket supporting the second gear, the bracket and the second gear being movable between a first position, in which the thread on the second gear engages the teeth of the depth stop rod, and a second position, in which the thread on the second gear does not engage the teeth of the depth stop rod; and a biasing member biasing the bracket and the second gear toward the first position.

11. A plunge router comprising:

a base;

a motor assembly supported by the base, the motor assembly including a motor for driving a tool element and a motor housing for supporting the motor;

a depth adjustment mechanism supported by at least one of the base and the motor assembly, the depth adjustment mechanism including a depth stop rod having a plurality of teeth;

an actuator movable to finely adjust the depth stop rod along a linear path, relative to the base, to finely adjust the depth of cut of the tool element;

a depth adjustment shaft having a first end and a second end, the first end being coupled to the actuator;

a first gear having an inner surface engageable with the second end of the depth adjustment shaft, and an outer surface having a plurality of teeth;

a second gear including a plurality of teeth engaging the teeth of the first gear, and at least one thread engaging at least a portion of the teeth of the depth stop rod;

a bracket supporting the second gear, the bracket and the second gear being movable between a first position, in which the thread on the second gear engages the teeth of the depth stop rod, and a second position, in which the thread on the second gear does not engage the teeth of the depth stop rod; and a biasing member biasing the bracket and the second gear toward the first position.

12. The plunge router of claim 11, wherein the actuator is supported by the motor housing and the depth stop rod is supported by the base.

13. The plunge router of claim 11, wherein the depth adjustment mechanism further comprises a depth adjustment shaft having a first end coupled to the actuator and a second end coupled to the transmission, wherein rotation of the actuator rotates the depth adjustment shaft, which causes the depth stop rod to move relative to the base.

14. The plunge router of claim 11, wherein the actuator is rotatable, wherein rotation of the actuator rotates the depth adjustment shaft, the first gear, and the second gear, which moves the depth stop rod relative to the base, when the bracket and the second gear are in the first position, and wherein rotation of the actuator does not move the depth stop rod relative to the base when the bracket and the second gear are in the second position.

15. The plunge router of claim 11, wherein the actuator is a first actuator, wherein the depth adjustment mechanism further includes a second actuator coupled to the bracket, and wherein the second actuator is movable, against the bias of the biasing member, to disengage the second gear and the depth stop rod to coarsely adjust the depth of cut of the tool element.

16. The plunge router of claim 11, wherein the actuator is a first actuator, and wherein the depth adjustment mechanism further includes a second actuator movable to coarsely adjust the depth of cut of the tool element.

17. The plunge router of claim 16, wherein the first actuator is supported by the motor assembly and the second actuator is supported by the base.

18. The plunge router of claim 16, wherein the first actuator is rotatable and the second actuator is moved linearly.

19. The plunge router of claim 11, further comprising a depth stop supported by and movable relative to the base, the depth stop including a plurality of top surfaces positioned at different levels relative to one another, the depth stop being movable to selectively align one of the plurality of top surfaces with the depth stop rod such that the depth stop rod engages the one of the plurality of top surfaces aligned with the depth stop rod when the plunge router is plunged downward.

* * * * *